United States Patent
Cheng et al.

(10) Patent No.: US 11,849,503 B2
(45) Date of Patent: Dec. 19, 2023

(54) PROXIMITY SERVICE MULTI-HOP RELAY CONFIGURATION

(71) Applicant: QUALCOMM Incorporated, San Diego, CA (US)

(72) Inventors: Hong Cheng, Basking Ridge, NJ (US); Karthika Paladugu, San Diego, CA (US); Dan Vassilovski, Del Mar, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 17/142,110

(22) Filed: Jan. 5, 2021

(65) Prior Publication Data

US 2021/0250749 A1 Aug. 12, 2021

Related U.S. Application Data

(60) Provisional application No. 62/971,471, filed on Feb. 7, 2020.

(51) Int. Cl.
*H04W 8/00* (2009.01)
*H04W 88/04* (2009.01)
(Continued)

(52) U.S. Cl.
CPC ............ *H04W 8/005* (2013.01); *H04W 8/24* (2013.01); *H04W 12/0471* (2021.01);
(Continued)

(58) Field of Classification Search
CPC .................................................. H04W 8/005
See application file for complete search history.

(56) References Cited

U.S. PATENT DOCUMENTS

2013/0040558 A1  2/2013 Kazmi
2018/0098370 A1* 4/2018 Bangolae ............. H04W 76/14
(Continued)

FOREIGN PATENT DOCUMENTS

WO    WO-2020011907 A1    1/2020

OTHER PUBLICATIONS

"3rd Generation Partnership Project, Technical Specification Group Services and System Aspects, Enhanced Relays for Energy Efficiency and Extensive Coverage, Stage 1 (Release 17)", 3GPP Standard, Technical Report, 3GPP TR 22.866, 3rd Generation Partnership Project (3GPP), Mobile Competence Centre, 650, Route Des Lucioles, F-06921 Sophia-Antipolis Cedex, France, vol. SA WG1, No. V17.1.0, Dec. 20, 2019, (Dec. 20, 2019), pp. 1-43, XP051840906, Retrieved from the Internet: URL: ftp://ftp.3gpp.org/Specs/latest/Rel-17/22_series/22866-h10.zip. 22866-h10.doc. [Retrieved on Dec. 20, 2019], Paragraph [5.1.6].
(Continued)

*Primary Examiner* — Edan Orgad
*Assistant Examiner* — Won Tae C Kim
(74) *Attorney, Agent, or Firm* — Holland & Hart LLP

(57) ABSTRACT

Methods, systems, and devices for wireless communications are described. The described techniques provide for the configuration and operation of a multi-hop relay at different layers to enable a remote user equipment (UE) to act as a relay for a client UE that may be out of coverage of a network. For example, a network relay UE may establish a communication link with the network, and the network relay UE may transmit, to a remote UE, a relay configuration that authorizes the remote UE as a multi-hop relay to provide a connection to the network for one or more other UEs. The remote UE may transmit an acknowledgement to the network relay UE in response to receiving the relay configuration, and the remote UE may then transmit a relay dis-
(Continued)

covery message including multi-hop relay information based on receiving the relay configuration.

25 Claims, 19 Drawing Sheets

(51) Int. Cl.
*H04W 8/24* (2009.01)
*H04W 12/50* (2021.01)
*H04W 12/0471* (2021.01)
*H04W 92/18* (2009.01)

(52) U.S. Cl.
CPC ........... *H04W 12/50* (2021.01); *H04W 88/04* (2013.01); *H04W 92/18* (2013.01)

(56) References Cited

U.S. PATENT DOCUMENTS

| | | | |
|---|---|---|---|
| 2018/0139694 A1* | 5/2018 | Folke | H04W 76/14 |
| 2018/0234862 A1* | 8/2018 | Lee | H04W 88/04 |
| 2018/0288823 A1 | 10/2018 | Hampel et al. | |
| 2020/0107381 A1* | 4/2020 | Ahmad | H04W 52/0212 |
| 2020/0170075 A1* | 5/2020 | Xu | H04W 84/047 |
| 2020/0344708 A1* | 10/2020 | Liao | H04W 40/22 |
| 2021/0274422 A1* | 9/2021 | Norp | H04W 40/22 |
| 2022/0248298 A1* | 8/2022 | Liu | H04L 45/20 |
| 2022/0369215 A1* | 11/2022 | Dees | H04W 76/15 |

OTHER PUBLICATIONS

International Search Report and Written Opinion—PCT/US2021/012304—ISA/EPO—dated Apr. 13, 2021.

* cited by examiner

US 11,849,503 B2

PROXIMITY SERVICE MULTI-HOP RELAY CONFIGURATION

CROSS REFERENCE

The present application for patent claims the benefit of U.S. Provisional Patent Application No. 62/971,471 by Cheng et al., entitled "PROXIMITY SERVICE MULTI-HOP RELAY CONFIGURATION," filed Feb. 7, 2020, assigned to the assignee hereof, and expressly incorporated by reference herein.

FIELD OF TECHNOLOGY

The following relates generally to wireless communications and more specifically to proximity service multi-hop relay configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support proximity services (ProSe) using sidelink communications (e.g., communications over the PC5 link), where a UE may discover and communicate with other nearby UEs on allocated sidelink resources.

SUMMARY

The described techniques relate to improved methods, systems, devices, and apparatuses that support proximity service (ProSe) multi-hop relay configuration. Generally, the described techniques provide for the configuration and operation of multi-hop relay at different layers to enable a remote user equipment (UE) (e.g., a UE more than one hop away from the network) to act as a relay to a client UE. A client UE may be out of coverage of the network as well as a relay UE that is one hop away from the network. In some cases, the remote UE and client UE may be capable of communicating via unicast or groupcast in addition to broadcast signals. The multi-hop relay configuration procedure may include configuring an Access Stratum (AS) layer (e.g., Layer 2) or higher layer (e.g., Layer 3) to include relay discovery and authorization, address management, and route selection and connection establishment.

This multi-hop relay configuration and operation procedure may introduce new signaling protocol and/or information elements. For example, a remote UE may be configured and authorized as a relay UE before the remote UE may relay traffic to a client UE. The authorization protocol may include a single hop UE, acting as a UE-to-network relay, indicating the relay configuration to the remote UE. The relay configuration message may act as an authorization for the remote UE to begin acting as a relay UE. The remote UE may inform the UE-to-network relay that the configuration was successfully received and may then start a relay discovery procedure for client UEs to detect.

Once the configuration of a remote UE as a multi-hop relay UE is complete and a client UE discovers and then selects the multi-hop relay UE, additional multi-hop relay behaviors may be performed by the multi-hop relay UE. For example, the multi-hop relay UE may serve as a transparent relay to form a communication link between the client UE and the UE-to-network relay. In another example, the multi-hop relay UE may establish a secure connection directly with the client UE, the relay UE may then report the client UE communication to the UE-to-network relay as a new service for the relay UE. Thus in the second example, the relay UE may not be a transparent relay, and the UE-to-network relay may not be aware of the client UE.

A method of wireless communications a network relay UE is described. The method may include establishing a communication link with a network, transmitting, to a remote UE, a relay configuration that authorizes the remote UE as a multi-hop relay to provide a connection to the network for one or more client UEs, and providing a network connection service to the one or more client UEs through the remote UE according to the relay configuration.

An apparatus for wireless communications a network relay UE is described. The apparatus may include a processor, memory coupled with the processor, and instructions stored in the memory. The instructions may be executable by the processor to cause the apparatus to establish a communication link with a network, transmit, to a remote UE, a relay configuration that authorizes the remote UE as a multi-hop relay to provide a connection to the network for one or more client UEs, and provide a network connection service to the one or more client UEs through the remote UE according to the relay configuration.

Another apparatus for wireless communications a network relay UE is described. The apparatus may include means for establishing a communication link with a network, transmitting, to a remote UE, a relay configuration that authorizes the remote UE as a multi-hop relay to provide a connection to the network for one or more client UEs, and providing a network connection service to the one or more client UEs through the remote UE according to the relay configuration.

A non-transitory computer-readable medium storing code for wireless communications a network relay UE is described. The code may include instructions executable by a processor to establish a communication link with a network, transmit, to a remote UE, a relay configuration that authorizes the remote UE as a multi-hop relay to provide a connection to the network for one or more client UEs, and provide a network connection service to the one or more client UEs through the remote UE according to the relay configuration.

Some examples of the method, apparatuses, and non-transitory computer-readable medium described herein may further include operations, features, means, or instructions for receiving an acknowledgement from the remote UE based on transmitting the relay configuration.

Some examples of the method, apparatuses, and non-transitory computer-readable medium described herein may further include operations, features, means, or instructions for receiving, from the remote UE, a relay configuration request including UE capability information, where transmitting the relay configuration may be based on the relay configuration request.

Some examples of the method, apparatuses, and non-transitory computer-readable medium described herein may further include operations, features, means, or instructions for transmitting, to the network, a relay service code request based on receiving the relay configuration request.

Some examples of the method, apparatuses, and non-transitory computer-readable medium described herein may further include operations, features, means, or instructions for determining that the remote UE can serve as the multi-hop relay based on authorization information, where transmitting, to the network, the relay service code request may be further based on the determining and indicates that the remote UE can serve as the multi-hop relay.

Some examples of the method, apparatuses, and non-transitory computer-readable medium described herein may further include operations, features, means, or instructions for receiving, from the network, a code allocation for the remote UE as the multi-hop relay, where receiving the code allocation indicates that the remote UE can serve as the multi-hop relay.

In some examples of the method, apparatuses, and non-transitory computer-readable medium described herein, the relay configuration includes one or more of a relay service code, hop information, quality of service information, and network information.

In some examples of the method, apparatuses, and non-transitory computer-readable medium described herein, the relay service code indicates a service supported by the network.

Some examples of the method, apparatuses, and non-transitory computer-readable medium described herein may further include operations, features, means, or instructions for updating a second communication link with the remote UE based on the relay configuration.

In some examples of the method, apparatuses, and non-transitory computer-readable medium described herein, updating the second communication link further may include operations, features, means, or instructions for allocating an internet protocol (IP) address or prefix to the remote UE.

Some examples of the method, apparatuses, and non-transitory computer-readable medium described herein may further include operations, features, means, or instructions for receiving a communication request from the remote UE over a second communication link, where the communication request was relayed from the one or more client UEs of the remote UE.

In some examples of the method, apparatuses, and non-transitory computer-readable medium described herein, the communication request includes a service request and an identifier (ID) of the one or more client UEs.

Some examples of the method, apparatuses, and non-transitory computer-readable medium described herein may further include operations, features, means, or instructions for establishing a protocol data unit (PDU) session or a packet data network (PDN) connection with the network based on receiving the communication request.

Some examples of the method, apparatuses, and non-transitory computer-readable medium described herein may further include operations, features, means, or instructions for allocating an IP address or prefix to the client UE, and transmitting, to the one or more client UE via the remote UE, the IP address or prefix.

Some examples of the method, apparatuses, and non-transitory computer-readable medium described herein may further include operations, features, means, or instructions for reporting the one or more client UEs to the network based on receiving the communication request.

Some examples of the method, apparatuses, and non-transitory computer-readable medium described herein may further include operations, features, means, or instructions for receiving a service request from the remote UE over a second communication link, and transmitting, to the remote UE, an acknowledgement in response to the service request.

In some examples of the method, apparatuses, and non-transitory computer-readable medium described herein, the service request includes an ID of a client UE.

Some examples of the method, apparatuses, and non-transitory computer-readable medium described herein may further include operations, features, means, or instructions for establishing a PDU session or a PDN connection with the network based on receiving the service request, and updating the second communication link with the remote UE based on receiving the service request.

Some examples of the method, apparatuses, and non-transitory computer-readable medium described herein may further include operations, features, means, or instructions for reporting the client UE to the network based on receiving a report request from the remote UE or receiving the service request.

In some examples of the method, apparatuses, and non-transitory computer-readable medium described herein, the connection to the network from the remote UE to the one or more client UEs may be a sidelink connection.

A method of wireless communications at a remote UE is described. The method may include receiving, from a network relay UE, a relay configuration that authorizes the remote UE as a multi-hop relay to provide a connection to a network for one or more client UEs, transmitting a relay discovery message including relay information based on receiving the relay configuration, and providing a network connection service to the one or more client UEs according to the relay configuration based on the relay discovery message.

An apparatus for wireless communications at a remote UE is described. The apparatus may include a processor, memory coupled with the processor, and instructions stored in the memory. The instructions may be executable by the processor to cause the apparatus to receive, from a network relay UE, a relay configuration that authorizes the remote UE as a multi-hop relay to provide a connection to a network for one or more client UEs, transmit a relay discovery message including relay information based on receiving the relay configuration, and provide a network connection service to the one or more client UEs according to the relay configuration based on the relay discovery message.

Another apparatus for wireless communications at a remote UE is described. The apparatus may include means for receiving, from a network relay UE, a relay configuration that authorizes the remote UE as a multi-hop relay to provide a connection to a network for one or more client UEs, transmitting a relay discovery message including relay information based on receiving the relay configuration, and providing a network connection service to the one or more client UEs according to the relay configuration based on the relay discovery message.

A non-transitory computer-readable medium storing code for wireless communications at a remote UE is described. The code may include instructions executable by a processor to receive, from a network relay UE, a relay configuration that authorizes the remote UE as a multi-hop relay to provide a connection to a network for one or more client UEs, transmit a relay discovery message including relay information based on receiving the relay configuration, and provide a network connection service to the one or more client UEs according to the relay configuration based on the relay discovery message.

Some examples of the method, apparatuses, and non-transitory computer-readable medium described herein may further include operations, features, means, or instructions for transmitting an acknowledgement to the network relay UE based on receiving the relay configuration.

Some examples of the method, apparatuses, and non-transitory computer-readable medium described herein may further include operations, features, means, or instructions for transmitting, to the network relay UE, a relay configuration request including UE capability information, where receiving the relay configuration may be based on the relay configuration request.

Some examples of the method, apparatuses, and non-transitory computer-readable medium described herein may further include operations, features, means, or instructions for updating a communication link with the network relay UE based on transmitting the acknowledgement.

In some examples of the method, apparatuses, and non-transitory computer-readable medium described herein, updating the communication link further may include operations, features, means, or instructions for receiving an IP address or prefix from the network relay UE.

In some examples of the method, apparatuses, and non-transitory computer-readable medium described herein, transmitting the relay discovery message further may include operations, features, means, or instructions for transmitting the relay discovery message according to a periodic schedule.

In some examples of the method, apparatuses, and non-transitory computer-readable medium described herein, transmitting the relay discovery message further may include operations, features, means, or instructions for receiving a discovery query from the one or more client UEs, and transmitting the relay discovery message in response to the query.

In some examples of the method, apparatuses, and non-transitory computer-readable medium described herein, the relay information includes one or more of hop information, quality of service information, and network information.

Some examples of the method, apparatuses, and non-transitory computer-readable medium described herein may further include operations, features, means, or instructions for receiving a communication request from the one or more client UEs based on transmitting the relay discovery message.

In some examples of the method, apparatuses, and non-transitory computer-readable medium described herein, the communication request includes a service request and an ID of the one or more client UEs.

Some examples of the method, apparatuses, and non-transitory computer-readable medium described herein may further include operations, features, means, or instructions for transmitting the communication request from the one or more client UEs to the network relay UE.

Some examples of the method, apparatuses, and non-transitory computer-readable medium described herein may further include operations, features, means, or instructions for receiving security keys from the network relay UE, and establishing a communication link with the one or more client UEs using the security keys.

Some examples of the method, apparatuses, and non-transitory computer-readable medium described herein may further include operations, features, means, or instructions for receiving, from the network relay UE, an IP address or prefix for the one or more client UEs based on the communication request, transmitting, to the one or more client UEs, the IP address or prefix, and relaying communications from the network via the network relay UE to the one or more client UEs using the IP address or prefix.

Some examples of the method, apparatuses, and non-transitory computer-readable medium described herein may further include operations, features, means, or instructions for allocating an IP address or prefix for the one or more client UEs from the IP address or prefix for the remote UE received from the network relay UE, and establishing a communication link with the one or more client UEs using the IP address or prefix for the one or more client UEs.

Some examples of the method, apparatuses, and non-transitory computer-readable medium described herein may further include operations, features, means, or instructions for transmitting a service request to the network relay UE over a communication link, and receiving, from the network relay UE, an acknowledgement in response to the service request.

In some examples of the method, apparatuses, and non-transitory computer-readable medium described herein, the service request includes an ID of the one or more client UEs.

Some examples of the method, apparatuses, and non-transitory computer-readable medium described herein may further include operations, features, means, or instructions for updating the communication link with the network relay UE based on the service request.

Some examples of the method, apparatuses, and non-transitory computer-readable medium described herein may further include operations, features, means, or instructions for transmitting a report request to the network relay UE that requests the network relay UE to report the one or more client UEs to the network.

Some examples of the method, apparatuses, and non-transitory computer-readable medium described herein may further include operations, features, means, or instructions for relaying communications from the network to the one or more client UEs using the IP address or prefix for the one or more client UEs.

In some examples of the method, apparatuses, and non-transitory computer-readable medium described herein, the connection to the network from the remote UE to the one or more client UEs may be a sidelink connection.

DETAILED DESCRIPTION

A user equipment (UE) may be capable of directly communicating with other UEs via sidelink communications. For example, UEs may communicate with a network via another UE, such as a UE-to-network relay. In some examples, a UE may be within a coverage area of a base station and use a UE-to-network relay to achieve improved link quality. In other cases, a UE may be outside of a coverage area of a base station and may not be in direct communication with the base station. Thus, the UE may indirectly communicate with the base station through a UE-to-network relay UE via a sidelink channel. Some sidelink PC5 interface layers may not support proximity service (ProSe) multi-hop relay operation.

According to the techniques described herein, a UE that is capable of unicast or groupcast on the sidelink may be configured and authorized to operate as a relay by a UE-to-network relay UE. A relay configuration procedure may include a remote UE requesting relay configuration from a UE-to-network relay UE. The UE-to-network relay UE may respond with relay configuration including an internet protocol (IP) address or prefix for multi-hop relay services. Additionally or alternatively, the relay configuration may include a relay service code (RSC), an indicator of hop information from the network, a supported quality of service (QoS) level, a cell identifier (ID), or other information about the connection provided by the multi-hop relay that allows other UEs to perform the selection of the relay UE.

Once the multi-hop relay configuration of a remote UE is complete, the remote UE may begin transmitting a relay discovery announcement, which may be referred to as a relay discovery message. After a client UE discovers and selects the remote UE as the relay, the remote UE follows new multi-hop relay UE behaviors during relay operation. In some examples, the remote UE may serve as a transparent multi-hop relay to form a connection between the client UE and the UE-to-network relay UE. In another example, the remote UE may establish a secure connection directly with the client UE. Accordingly, network utilization and communication quality may be improved through the use of multi-hop relays via sidelink channels in a ProSe system.

Aspects of the disclosure are initially described in the context of wireless communications systems. Aspects of the disclosure are further illustrated by and described with reference to apparatus diagrams, system diagrams, and flowcharts that relate to proximity service multi-hop relay configuration.

Figure 1:
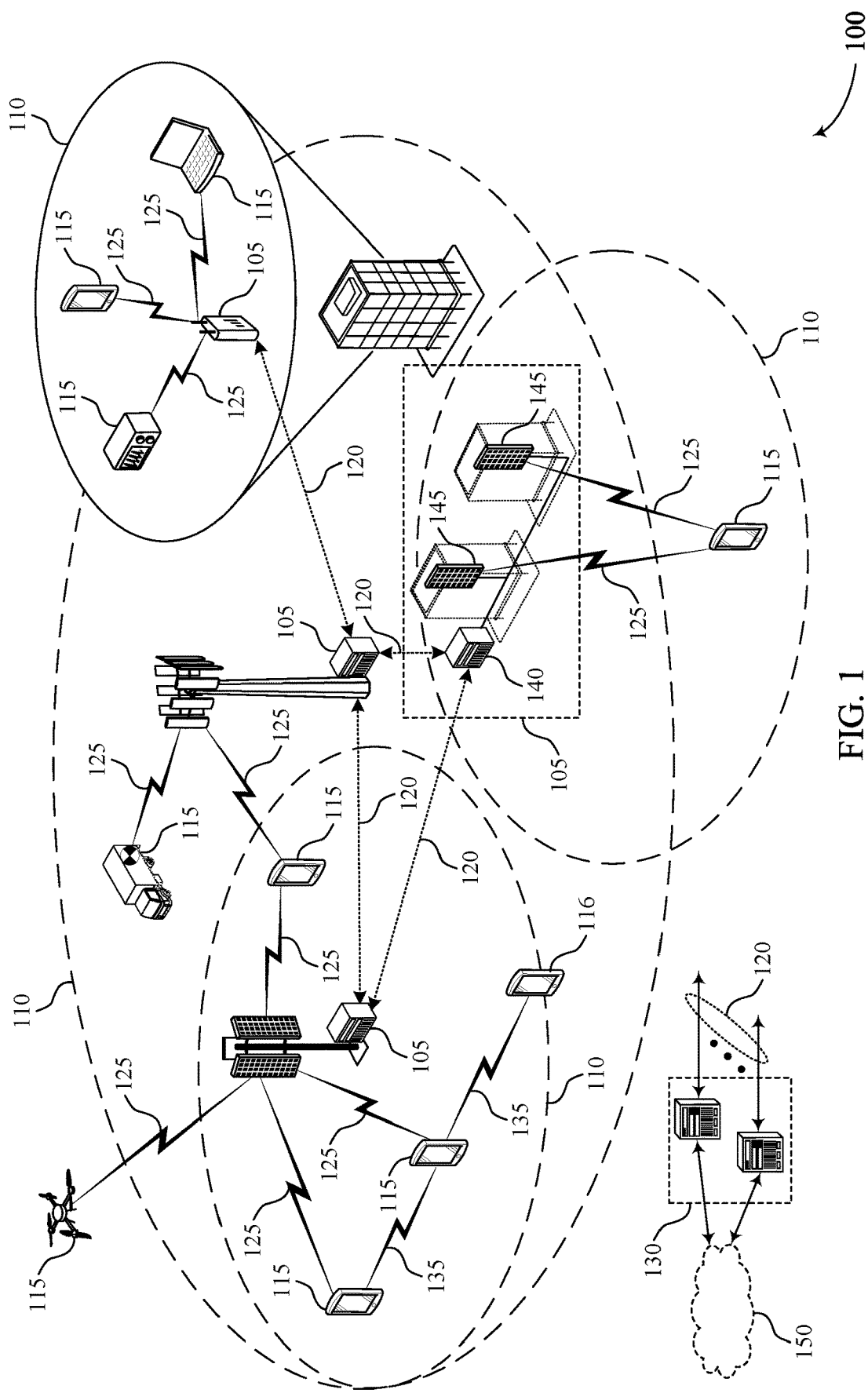
FIG. 1 illustrates an example of a system for wireless communications that supports proximity service multi-hop relay configuration in accordance with aspects of the present disclosure.

FIG. 1 illustrates an example of a wireless communications system 100 that supports proximity service multi-hop relay configuration in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_{s=1}/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an ID for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may be a distributed system where UEs 115 and 116 monitor for and receive packets from one or more other UEs 115 and 116, for example, via a communication link 135 (e.g., a sidelink). The one or more UEs 115 and remote UE 116 using communication link 135 may be inside or outside of coverage area 110 and may be configured for ProSe multi-hop relay at one or more protocol stack layers (e.g., at Layer 2 and Layer 3). In some examples, a UE 115 may be a UE-to-Network relay, which may also be referred to herein as a network relay UE. A UE-to-Network relay UE 115 may be connected to the network via communication link 125 (e.g., a Uu interface link) and may also be connected to a remote UE 116 via communication link 135. Thus, the UE-to-Network relay UE 115 may transmit traffic between the network and the remote UE 116.

In some cases, a UE 115 may benefit from the remote UE 116 relaying information from the network, via the UE-to-Network relay UE 115, to the UE 115, which may also be referred to herein as a client UE. For instance, the client UE 115 may have poor signal quality with the network and the UE-to-Network relay UE 115. Thus, it may be beneficial for the remote UE 116 to be configured as a relay. More specifically, the remote UE 116 may be configured as a multi-hop relay such that traffic travels across at least a first hop (e.g., the Uu interface) and a second hop (e.g., a sidelink). In some cases, additional hops may be included. Conventionally, multi-hop relay across one or more sidelinks was inefficient and resource intensive because UEs 115 and 116 communicating via sidelink were limited to broadcast sidelink communications. Relaying traffic over multiple hops on the sidelink via broadcast communications may result in a large signaling overhead that results in ineffective communications. The use of unicast or groupcast or both may allow a UE 115 to efficiently relay traffic over one or more sidelink hops. In some examples, UEs 115 may be configured for Public Safety such as emergency responder radios that may benefit from multi-hop relay operations. In some examples, the remote UE 116 may act as a multi-hop relay or a client UE, and the client UE 115 or remote UE 116 may act as a remote UE or a multi-hop relay.

ProSe AS layer (e.g., Layer 2) and higher layer (e.g., Layer 3) designs may be enhanced to support relay operation with multi-hop operation support. For example, the designs may include UE 115 or 116 relay discovery and authorization, address management, and route selection and connection establishment. Each of these features may use a new signaling protocol and introduce additional information elements. For example, a remote UE 116 may be configured and authorized as a relay UE. This new authorization protocol may include a UE 115 acting as a UE-to-network relay indicating the relay configuration to the remote UE 116. The relay configuration message may act as an authorization for the remote UE 116 to begin acting as a relay UE. The remote UE 116 may inform the UE-to-network relay UE 115 that the configuration was successful and start a relay discovery procedure. When a UE 115 discovers and connects to remote UE 116, remote UE 116 may provide network traffic to the UE 115, which may be a client UE 115 of remote UE 116. Accordingly, the AS layer and higher layer designs may support the configuration and operation of a remote UE 116 as a multi-hop UE to improve network coverage and utilization.

Figure 2:
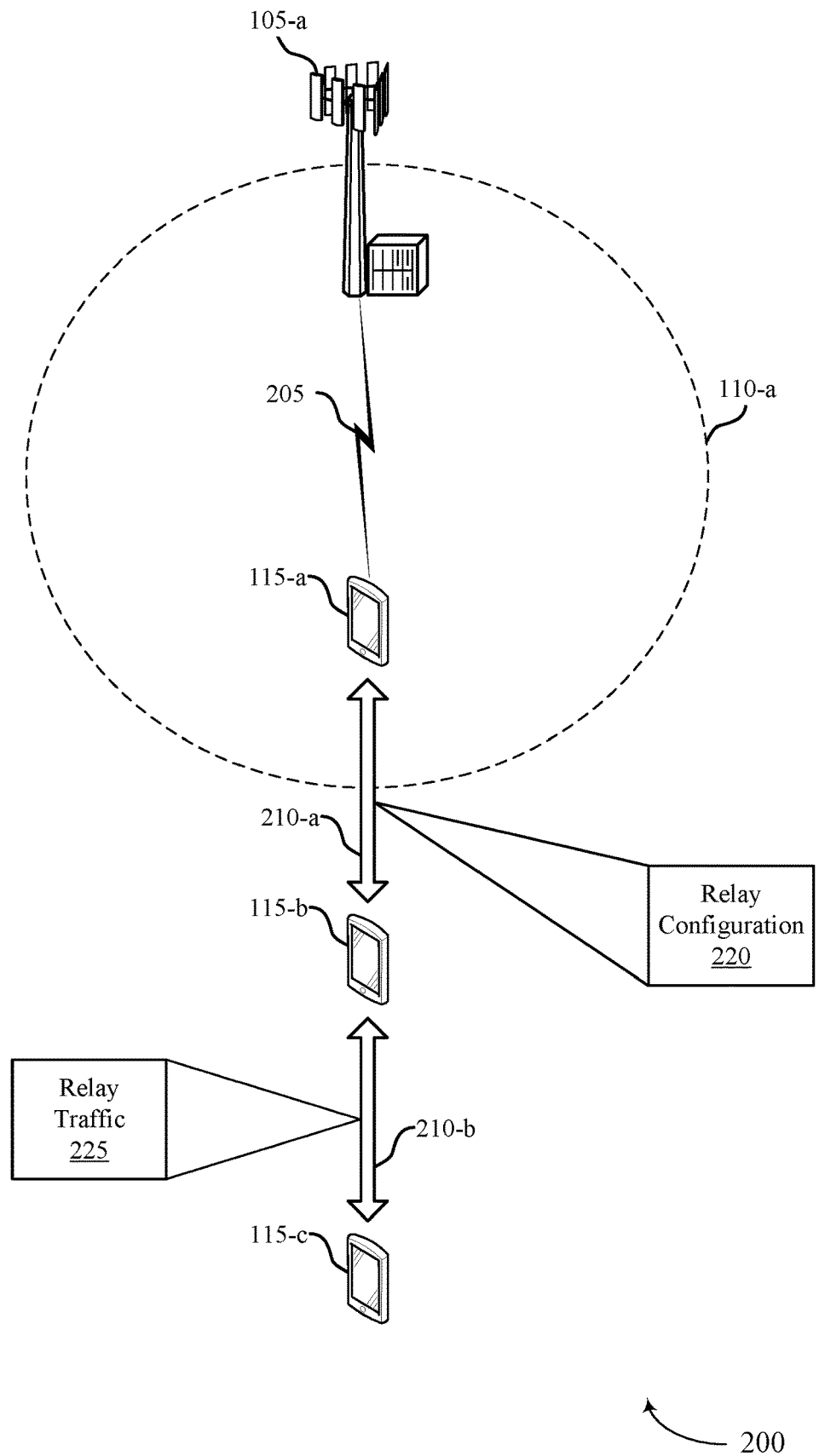
FIG. 2 illustrates an example of a wireless communications system that supports proximity service multi-hop relay configuration in accordance with aspects of the present disclosure.

FIG. 2 illustrates an example of a wireless communications system 200 that supports proximity service multi-hop relay configuration in accordance with aspects of the present disclosure. In some examples, wireless communications system 200 may implement aspects of wireless communications system 100. Wireless communications system 200 may be an NR ProSe system and may include base station 105-*a* as well as UEs 115-*a*, 115-*b*, and 115-*c*, which may be examples of a base station 105 and a UE 115, respectively, as described with reference to FIG. 1. The techniques described with reference to FIG. 2 may also apply to communications in a system other than a ProSe system.

UEs 115 in wireless communications system 200 may be distributed throughout the system and communicate via sidelinks 210. In some examples, UE 115-*a* may be within coverage area 110-*a* of base station 105-*a*. Accordingly, UE 115-*a* and base station 105-*a* may communicate via Uu link 205. In some cases, UEs 115-*b* and 115-*c* may be outside of coverage area 110-*a* of base station 105-*a* and may not be in direct communication with base station 105-*a*. In other cases, UEs 115-*b* and 115-*c* may be inside of coverage area 110-*a* of base station 105-*a* but may have a poor direct connection with base station 105-*a*. Thus, UE 115-*b* may indirectly communicate with base station 105-*a* through network relay UE 115-*a*, which may be a UE-to-network relay UE 115, via sidelink 210-*a*. UE 115-*c* may indirectly communicate with base station 105-*a* through UE 115-*a* and UE 115-*b*, which may be a multi-hop relay, via sidelinks 210-*a* and 210-*b*.

Multi-hop relay on a sidelink 210 may pose different challenges from hop designs on the Uu link 205 because the sidelink PC5 interface is different from the Uu interface. The traditional PC5 interface layers may not be designed to support ProSe multi-hop relay operation. In order to support operation, a multi-hop relay UE (e.g., remote UE 115-*b*) may be configured and authorized to operate as a relay by a network relay UE 115 (e.g., UE 115-*a*) via relay configuration 220 after sidelink 210-*a* is established between UE 115-*a* and UE 115-*b*. The relay configuration 220 of remote UE 115-*b* may include remote UE 115 requesting relay configuration 220 from network relay UE 115-*a*. UE 115-*a* may request a new relay service from the network via the Uu link 205 with base station 105-*a*. In some cases, the relay service request may be based on the relay configuration request from UE 115-*b*. The base station 105-*a* may transmit a relay service code allocation to UE 115-*a* in response to the relay service request. UE 115-*a* may transmit the relay configuration 220 to UE 115-*b* on sidelink 210-*a* via a PC5 message. The relay configuration 220 may include a relay service code, an indicator of hop information from the network, a supported QoS level, a cell ID, or other information about the connection provided by the multi-hop relay that may allow other UEs 115 (e.g., UE 115-*c*) to perform the selection of the relay UE 115-*b*. In some cases, UE 115-*b* may transmit an acknowledgment (ACK) for the relay configuration 220 to UE 115-*a*. UE 115-*b* may update the sidelink 210-*a* with UE 115-*a* in order to serve as a multi-hop relay.

Once the multi-hop relay configuration 220 of UE 115-*b* is complete, UE 115-*b* may begin transmitting a relay discovery announcement. In some cases, a relay discovery announcement may be referred to as a relay discovery message or a discovery response. For example, UE 115-*b* may periodically broadcast a relay discovery announcement based on a schedule. In another example, UE 115-*b* may transmit a unicast discovery announcement to a UE 115 (e.g., UE 115-*c*) in response to a discovery query from the UE 115. The relay discovery announcement may include relay information for the UE 115.

After a relay client UE 115 (e.g., UE 115-*c*) discovers then selects the relay UE 115-*b*, additional new relay UE behaviors may be followed during a relay operation. In some examples, the relay UE 115-*b* may serve as a transparent relay to form a connection between the client UE 115-*c* and the network relay UE 115-*a*. In another example, the relay UE 115-*b* may establish a secure connection directly with the client UE 115-*c*, and the relay UE 115-*b* may report communications from the client UE 115-*c* to the network relay UE 115-*a* as a new service for the relay UE 115-*b*. For example, relay UE 115-*b* may receive relay traffic 225 from client UE 115-*c*. Relay UE 115-*b* may forward the relay traffic 225 to the network. Thus, the relay UE 115-*b* may not be transparent, and the network relay UE 115-*a* may not be aware of the client UE 115-*c* or report the client UE 115-*c* to the base station 105-*a* unless instructed by UE 115-*b* to do so.

In some cases, a sidelink 210 may be referred to as the PC5 link. The PC5 interface may include multiple planes such as the PC5 discovery plane (PC5-D), the PC5 signaling protocol stack (PC5-S), and the PC5 user plane (PC5-U). The PC5-D may be used for direct discovery that allows a UE 115 to discover other nearby UEs 115. In some examples, the ProSe protocol may interact directly with the MAC layer. The PC5-S may be used for control plane signaling over the PC5 interface to establish, maintain, and release secure direct links between UEs 115. The PC5-S may interact with the control plane PC3 interface for service authorization when a UE 115 is directly connected to the network. The PC5-U may be used to send traffic directly between UEs 115. For example, a UE 115 may establish one or more logical channel, and a logical channel identifier (LCID) that uniquely identifies a logical channel may be included within the MAC header or subheader. In some cases, IP address or prefixes may be accessed on the PC5-U (e.g., in IP tables). The IP information may be used to route a ProSe traffic flow to the right sidelink radio bearer (SLRB).

Figure 3:
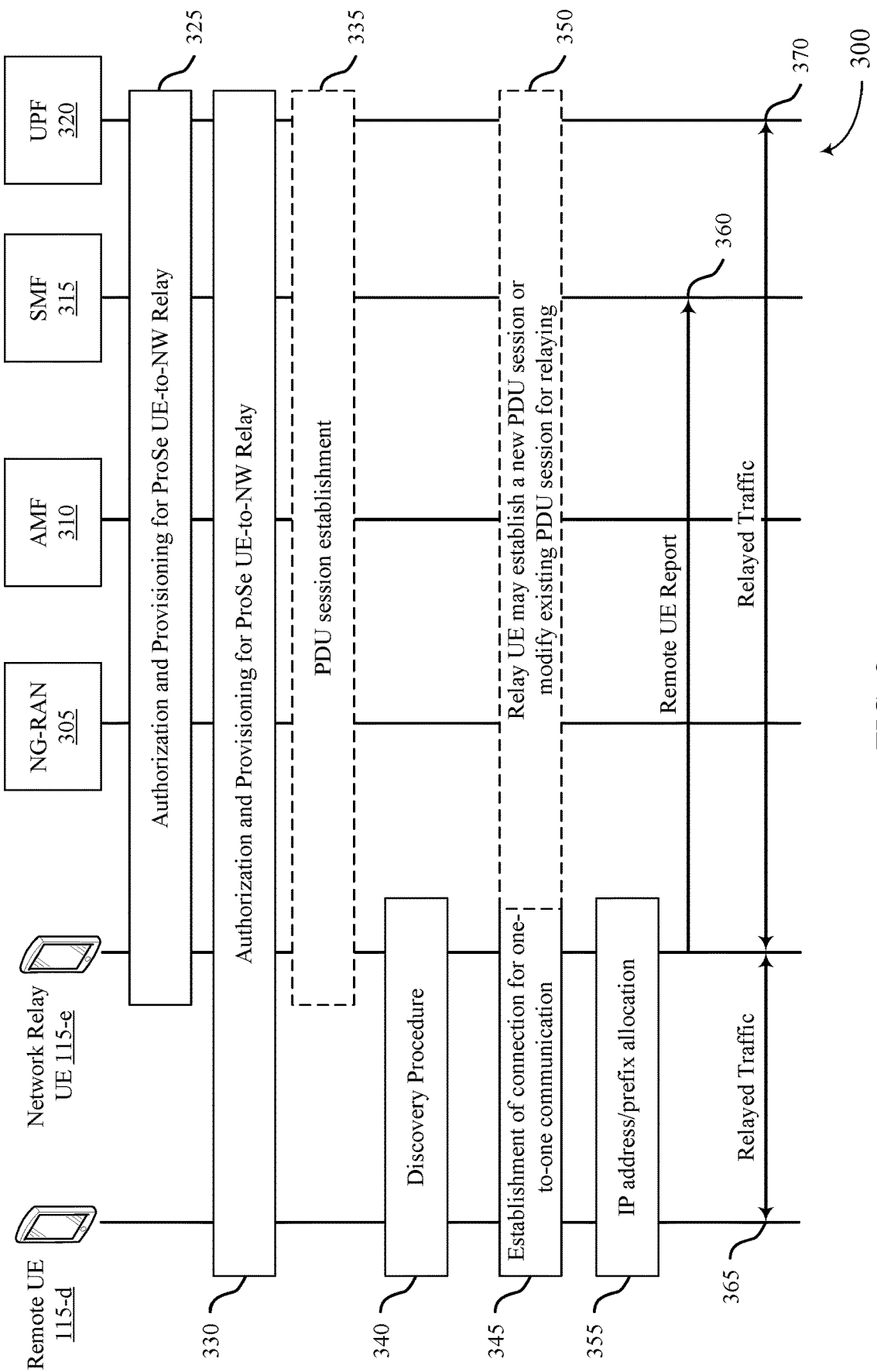
FIG. 3 illustrates an example of a process flow that supports proximity service multi-hop relay configuration in accordance with aspects of the present disclosure.

FIG. 3 illustrates an example of a process flow 300 that supports proximity service multi-hop relay configuration in accordance with aspects of the present disclosure. In some examples, process flow 300 may implement aspects of wireless communications system 100 and 200. Process flow 300 may include remote UE 115-*d*, which may be an example of UE 115-*b* as described with respect to FIG. 2, and network relay UE 115-*e*, which may be an example of UE 115-*a* as described with respect to FIG. 2. Process flow 300 may also include Next Generation Radio Access Network (NG-RAN) 305, AMF 310, Session Management Control Function (SMF) 315, and UPF 320.

In the following description of the process flow 300, the operations of remote UE 115-*d*, network relay UE 115-*e*, NG-RAN 305, AMF 310, SMF 315, and UPF 320 may occur in a different order than the exemplary order shown. Certain illustrated operations may also be left out of the process flow 300, or other operations may be added to the process flow 300. It is to be understood that while remote UE 115-*d*, network relay UE 115-*e*, NG-RAN 305, AMF 310, SMF 315, and UPF 320 are shown performing a number of the operations of process flow 300, any wireless device may perform the operations shown.

At 325, network relay UE 115-*e*, NG-RAN 305, AMF 310, SMF 315, and UPF 320 may undergo authorization and provision for ProSe UE-to-network Relay (i.e., network relay UE 115-*e*) to attach to the network. In some examples, a RRC may be established between the network relay UE 115-*e* and the network (e.g., NG-RAN 305).

At 330, remote UE 115-*d*, network relay UE 115-*e*, NG-RAN 305, AMF 310, SMF 315, and UPF 320 may undergo authorization and provision for ProSe UE-to-network Relay (i.e., network relay UE 115-*e*) to provide an attachment to the network for remote UE 115-*d*.

At 335, network relay UE 115-*e*, NG-RAN 305, AMF 310, SMF 315, and UPF 320 may establish a protocol data unit (PDU) session or a PDN connection.

At 340, remote UE 115-*d* and network relay UE 115-*e* may discover each other according to a discovery procedure. For example, the remote UE 115-*d* may identify the presence of at least one suitable relay UE 115 (e.g., network relay UE 115-*e*) to request relay service in its proximity. The network relay UE 115-*e* may announce its presence by transmitting one or more discovery messages (e.g., relay discovery messages). During the discovery procedure, the remote UE 115-*d* may evaluate the ability for the network relay UEs 115-*e* to support the remote UE 115-*d* as a multi-hop relay.

If the network relay UE 115-*e* is able to support the remote UE 115-*d* as a multi-hop relay, the remote UE 115-*d* and network relay UE 115-*e* may proceed to 345.

At 345, remote UE 115-*d* and network relay UE 115-*e* may establish a connection for one-to-one communication to provide the relay service to remote UE 115-*d* via unicast traffic on a sidelink. While establishing the direct connection, the remote UE 115-*b* may be allocated an IP address at 355 to be used for the relayed traffic at 365.

At 350, remote UE 115-*d*, network relay UE 115-*e*, NG-RAN 305, AMF 310, SMF 315, and UPF 320 may establish a new PDU session or PDN connection, or may modify an existing PDU session or PDN connection, for relaying traffic to remote UE 115-*d*. The establishment of connections at 345 and 350 may support the remote UE 115-*d* as a multi-hop relay to serve an additional UE 115. For example, a higher QoS level may be desired for a multi-hop relay than the QoS level used for a non-relaying UE 115.

At 355, remote UE 115-*d* may receive an IP address or prefix allocation from the network relay UE 115-*e*.

At 360, network relay UE 115-*e* may report, to the network, the information on the remote UE 115-*d* after the network relay UE 115-*e* establishes a one-to-one direct link with the remote UE 115-*d*. The reporting procedure may be enhanced from previous reporting to support the remote UE 115-*d* as a multi-hop relay such that additional UEs may be served by remote UE 115-*d*. For example, network relay UE 115-*e* may report relay capabilities of remote UE 115-*d* to the network for future authorization of remote UE 115-*d*.

At 365, network relay UE 115-*e* may relay traffic 370 from the network to remote UE 115-*d*. This relayed traffic may be further relayed by remote UE 115-*d* to an additional UE 115.

Figure 4:
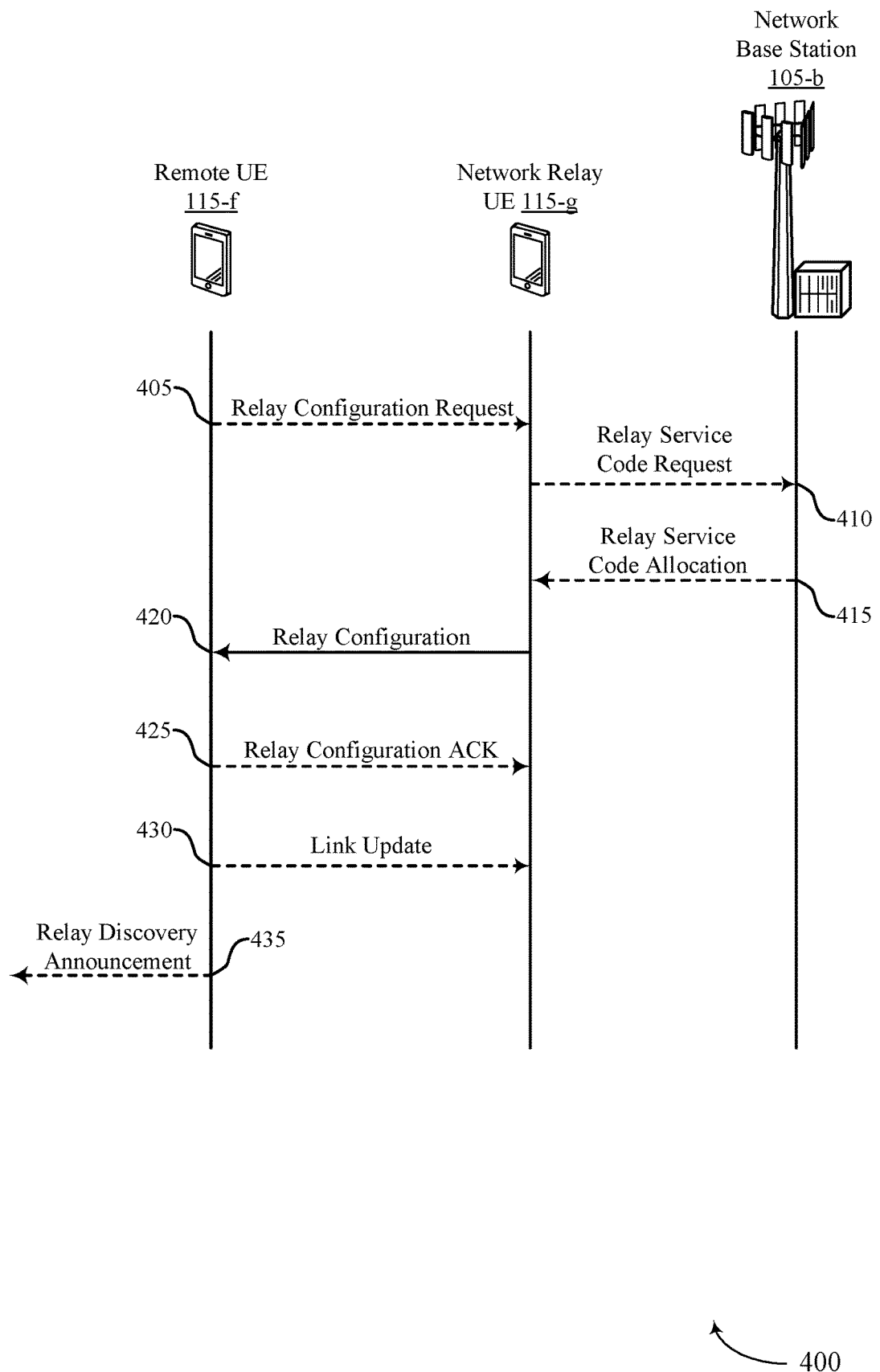
FIG. 4 illustrates an example of a process flow that supports proximity service multi-hop relay configuration in accordance with aspects of the present disclosure.

FIG. 4 illustrates an example of a process flow 400 that supports proximity service multi-hop relay configuration in accordance with aspects of the present disclosure. In some examples, process flow 400 may implement aspects of wireless communications system 100 and 200. Process flow 400 may include remote UE 115-*f*, which may be an example of UE 115-*b* as described with respect to FIG. 2, network relay UE 115-*g*, which may be an example of UE 115-*a* as described with respect to FIG. 2, and network base station 105-*b*, which may be an example of base station 105-*a* as described with respect to FIG. 2. The following process may configure and authorize remote UE 115-*f* as a multi-hop relay.

In the following description of the process flow 400, the operations of remote UE 115-*f*, network relay UE 115-*g*, and base station 105-*b* may occur in a different order than the exemplary order shown. Certain illustrated operations may also be left out of the process flow 400, or other operations may be added to the process flow 400. It is to be understood that while remote UE 115-*f*, network relay UE 115-*g*, and base station 105-*b* are shown performing a number of the operations of process flow 400, any wireless device may perform the operations shown. In some examples, process flow 400 may follow process flow 300, and network relay UE 115-*g* may have an established communication link with the network via base station 105-*b*.

At 405, remote UE 115-*f* may transmit, and network relay UE 115-*g* may receive, a relay configuration request. In some examples, remote UE 115-*f* that is capable of serving as a multi-hop relay may indicate its relay capability and request configuration with this PC5-S signaling message: Relay Configuration Request.

At 410, network relay UE 115-*g* may transmit, and network base station 105-*b* may receive, a relay service code request. In some cases, network relay UE 115-*g* may perform additional signaling towards the 5G system via network base station 105-*b* to request a new Relay Service Code for this multi-hop relay via remote UE 115-*f*. The network base station 105-*b* or the network relay UE 115-*g* may determine based on authorization info if the remote UE 115-*f* can serve as a multi-hop relay. In some examples, network relay UE 115-*g* may determine that the remote UE 115-*f* can serve as the multi-hop relay based on authorization information, and network relay UE 115-*g* may transmit, to the network, the relay service code request is based on this determination. Additionally or alternatively, network relay UE 115-*g* transmitting the relay service code request may indicate the determination that the remote UE 115-*f* can serve as the multi-hop relay.

At 415, network base station 105-*b* may transmit. and network relay UE 115-*g* may receive. a relay service code allocation for the multi-hop relay. In some examples, the relay service code allocation from the network base station 105-*b* may act as an authorization or determination by the network that the remote UE 115-*f* can serve as a multi-hop relay.

At 420, network relay UE 115-*g* may transmit. and remote UE 115-*f* may receive. the relay configuration, which may be an example of relay configuration 220 as described with respect to FIG. 2. The relay configuration may authorize the remote UE 115-*f* as a multi-hop relay to provide a connection to the network for one or more client UEs 115. The relay configuration may correspond to the relay service code allocation received at the network relay UE 115-*g* at 415. Further, the relay configuration may authorize remote UE 115-*f* to operate as a multi-hop relay and may use a new PC5-S signaling message: Relay Configuration. In some examples, the relay configuration may include a Relay Service Code that indicate the relay service supported and potentially the public land mobile network (PLMN) IDs of the network (e.g., 5G System), an indicator of hop information (e.g., one Uu interface hop and one sidelink PC5 interface hop) from the network base station 105-*b*, a QoS level supported, a cell ID or other information about the connection provided by the multi-hop relay. This information in the relay configuration may allow the other UEs 115 to perform a selection of a relay, for example, a selection between network relay UE 115-*g* and remote UE 115-*f* based on the information. For example, an additional UE 115 may select the relay with the higher QoS level.

At 425, remote UE 115-*f* may transmit, and network relay UE 115-*g* may receive, a relay configuration ACK via a new PC5-S message in response to successfully receiving the relay configuration at 420.

At 430, remote UE 115-*f* may initiate a link update with network relay UE 115-*g* to support the configured multi-hop relay operations based on successfully receiving the relay configuration at 420. For example, remote UE 115-*f* may update the Layer 2 link with the network relay UE 115-*g* to serve as a multi-hop relay, such as adding new IP prefix allocations to the remote UE 115-*f* for relay services, etc.

At 435, remote UE 115-*f* may transmit a relay discovery announcement or a relay discovery message to one or more other UEs 115. The relay discovery message may include relay information for other UEs 115 to discover and select. For instance, remote UE 115-*f* may actively transmit a relay discovery message periodically according to a schedule (e.g., Model A). In another example, remote UE 115-*f* may transmit a relay discovery message in response to a discovery query or solicitation from another UE 115 (e.g., Model B). The relay discovery message may include relay information based on information in the relay configuration received by remote UE 115-*f* at 420. For example, the relay information may include hop information, network information, and QoS level information.

Figure 5:
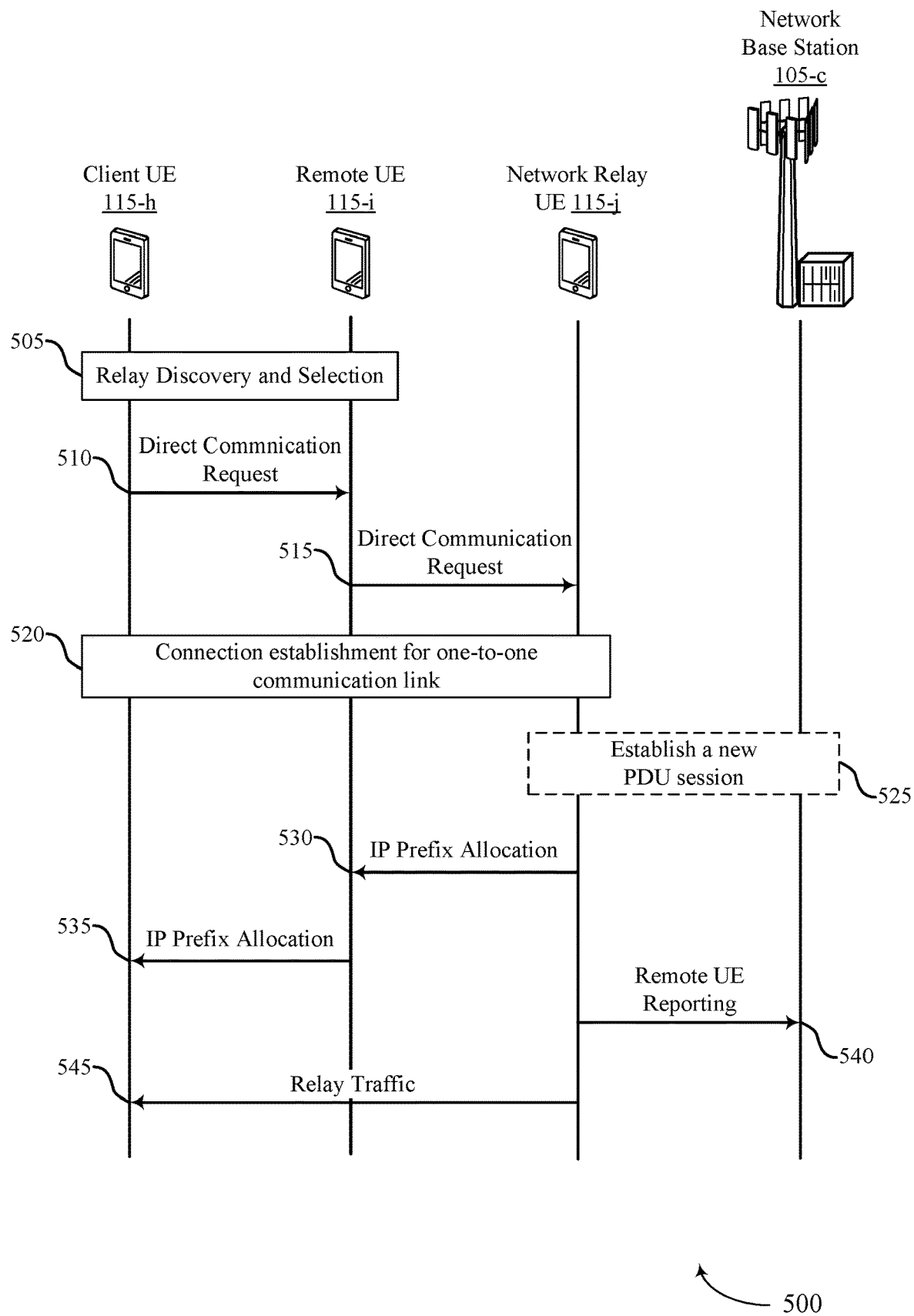
FIG. 5 illustrates an example of a process flow that supports proximity service multi-hop relay configuration in accordance with aspects of the present disclosure.

FIG. 5 illustrates an example of a process flow 500 that supports proximity service multi-hop relay configuration in accordance with aspects of the present disclosure. In some examples, process flow 500 may implement aspects of wireless communications system 100 and 200. Process flow 500 may include client UE 115-*h*, which may be an example of UE 115-*c* as described with respect to FIG. 2, remote UE 115-*i*, which may be an example of UE 115-*b* as described with respect to FIG. 2, network relay UE 115-*j*, which may be an example of UE 115-*a* as described with respect to FIG. 2, and network base station 105-*c*, which may be an example of base station 105-*a* as described with respect to FIG. 2.

In the following description of the process flow 500, the operations of client UE 115-*h*, remote UE 115-*i*, network relay UE 115-*j*, and base station 105-*c* may occur in a different order than the exemplary order shown. Certain illustrated operations may also be left out of the process flow 500, or other operations may be added to the process flow 500. It is to be understood that while client UE 115-*h*, remote UE 115-*i*, network relay UE 115-*j*, and base station 105-*c* are shown performing a number of the operations of process flow 500, any wireless device may perform the operations shown. In some cases, the operations of process flow 500 may provide a network connection service to one or more client UEs 115-*h* through the remote UE 115-*i* according to the relay configuration, and the operations of process flow 500 may follow those of process flow 400.

At 505, remote UE 115-*i* may transmit a discovery signal to client UE 115-*h* as described above at 435 with respect to FIG. 4. Client UE 115-*h* may select remote UE 115-*i* as a multi-hop relay based on the discovery signal. For example, client UE 115-*h* may select remote UE 115-*i* as a multi-hop relay based on the relay information included in the discovery signal transmitted by remote UE 115-*i*.

At 510, client UE 115-*h* may transmit and remote UE 115-*i* may receive a direct communication request. The communication request may request relay services from remote UE 115-*i*. In some examples, the direct communication request message may also be referred to as a Relay Service Request or a Relay Connection Request. The communication request may include a service request and an ID of the one or more client UEs 115-*h*. The service requested may include, for example, S-NSSAI, PLMN ID, data network name (DNN), session and service continuity (SSC) Mode, QoS, etc., which may be in the form of a Relay Service Code. Additionally or alternatively, each client UE 115-*h* may indicate its identity, for example in the form of Application Layer ID.

At 515, remote UE 115-*i* may transmit and network relay UE 115-*j* may receive the relayed communication request from client UE 115-*h* over a sidelink (e.g., a sidelink channel established before or during the relay configuration of remote UE 115-*i*). In some examples, the Remote UE 115-*i* relays the PC5-S communication request to the network relay UE 115-*j*, using a pre-established channel such as a pre-established signaling radio bearer (SRB) as in the link update of 430 of FIG. 4 or another pre-configured channel. network relay UE 115-*j* may determine that this communication request is a relayed connection request (e.g., based on the service request or client UE 115-*h* ID) and trust the remote UE 115-*i* with the following relay operation.

At 520, client UE 115-*h*, remote UE 115-*i* and network relay UE 115-*j* may establish a connection for one-to-one communications over the sidelink. For example, client UE 115-*h* may perform a relay connection setup with remote UE 115-*i*. In some cases, the remote UE 115-*i* may serve as a transparent relay of the PC5-S signaling message. Thus, network relay UE 115-*j* may trust remote UE 115-*i*, and remote UE 115-*i* may be allowed to handle the security keys for client UE 115-*h*. For example, remote UE 115-*i* may receive security keys from the network relay UE 115-*j* and establish a communication link with the one or more client UEs 115-*h* using the security keys. The remote UE 115-*i* may act as a network relay for the client UE 115-*h*.

At 525, network relay UE 115-*j* may establish a new PDU session or PDN connection with the network via base station 105-*c*, for example based on the direct configuration.

At 530, network relay UE 115-*j* may allocate an IP address or prefix to the client UE 115-*h* based on the session established at 525, network relay UE 115-*j* may transmit and remote UE 115-*i* may receive the IP address or prefix allocation for relay services.

At 535, remote UE 115-*i* may relay to the client UE 115-*h* the IP prefix or address allocation received at 530.

At 540, network relay UE 115-*j* may report remote UE 115-*i* and client UE 115-*h* to the base station 105-*c*. This reporting may be based on the direct communication request at 515, for example, because the client UE 115-*h* may be visible to network relay UE 115-*j*. Relay traffic routing at 545 may be based on this reporting.

At 545, network relay UE 115-*j* may transmit, and client UE 115-*h* may receive, via remote UE 115-*i*, the relayed traffic from the network. For example, remote UE 115-*i* may relay communications from the network via the network relay UE 115-*j* to the one or more client UEs 115-*h* using the IP address or prefix from 530 and 535.

Figure 6:
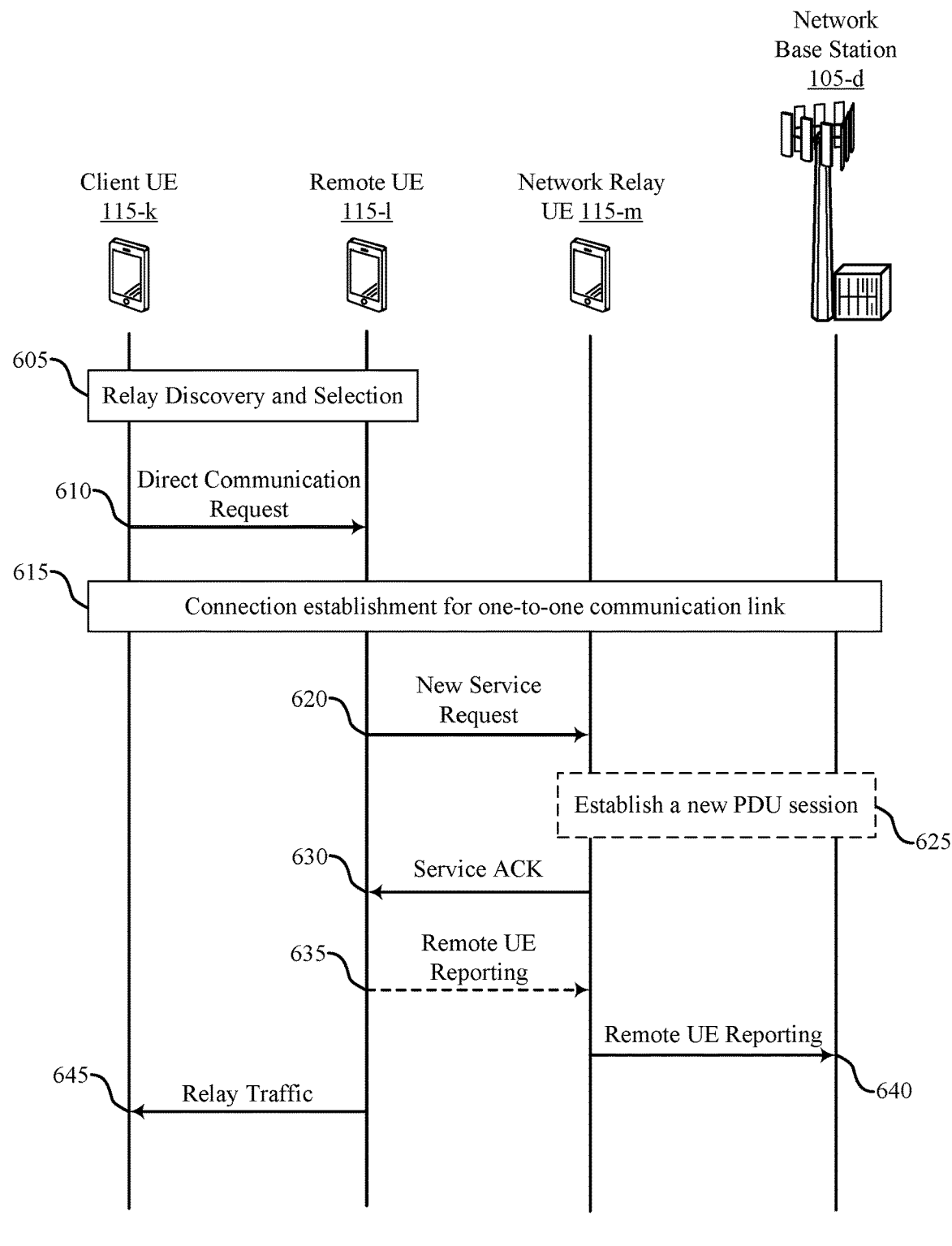
FIG. 6 illustrates an example of a process flow that supports proximity service multi-hop relay configuration in accordance with aspects of the present disclosure.

FIG. 6 illustrates an example of a process flow 600 that supports proximity service multi-hop relay configuration in accordance with aspects of the present disclosure. In some examples, process flow 600 may implement aspects of wireless communications system 100 and 200. Process flow 600 may include client UE 115-*k*, which may be an example of UE 115-*c* as described with respect to FIG. 2, remote UE 115-*l*, which may be an example of UE 115-*b* as described with respect to FIG. 2, network relay UE 115-*m*, which may be an example of UE 115-*a* as described with respect to FIG. 2, and network base station 105-*d*, which may be an example of base station 105-*a* as described with respect to FIG. 2.

In the following description of the process flow 600, the operations of client UE 115-*k*, remote UE 115-*l*, network relay UE 115-*m*, and base station 105-*d* may occur in a different order than the exemplary order shown. Certain illustrated operations may also be left out of the process flow 600, or other operations may be added to the process flow 600. It is to be understood that while client UE 115-*k*, remote UE 115-*l*, network relay UE 115-*m*, and base station 105-*d* are shown performing a number of the operations of process flow 600, any wireless device may perform the operations shown. In some cases, the operations of process flow 600 may provide a network connection service to one or more client UEs 115-*k* through the remote UE 115-*l* according to the relay configuration, and the operations of process flow 600 may follow those of process flow 400.

At 605, remote UE 115-*l* may transmit a discovery signal to client UE 115-*k* as described above at 435 with respect to FIG. 4. Client UE 115-*k* may select remote UE 115-*l* as a multi-hop relay based on the discovery signal. For example, client UE 115-*k* may select remote UE 115-*l* as a multi-hop relay based on the relay information included in the discovery signal transmitted by remote UE 115-*l*.

At 610, client UE 115-*k* may transmit, and remote UE 115-*l* may receive, a direct communication request. The communication request may request relay services from remote UE 115-*l*. In some examples, the direct communication request message may also be referred to as a Relay Service Request or a Relay Connection Request. The communication request may include a service request and an ID of the one or more client UEs 115-*k*. The service requested may include, for example, S-NSSAI, PLMN ID, DNN, SSC Mode, QoS, etc., which may be in the form of a Relay Service Code. Additionally or alternatively, each client UE 115-*k* may indicate its identity in the request, for example in the form of Application Layer ID.

At 615, remote UE 115-*l* may perform a connection establishment for one-to-one communication directly with the client UE 115-*k* as the remote UE 115-*l* may be authorized to access the necessary security information for security association. In some examples, remote UE 115-*l* may allocate an IP address or prefix for the one or more client UEs 115-*k* from the IP address or prefix for the remote UE 115-*l* use previously received from the network relay UE 115-*m* and may establish a communication link with the one or more client UEs 115-*k* using the IP address or prefix for the one or more client UEs 115-*k*.

At 620, remote UE 115-*l* may transmit a service request to the network relay UE over a communication link. For example, remote UE 115-*l* may request a new service from the network relay UE 115-*m* based on what relay service(s) the client UE 115-*k* requested at 610. The service request may include a request for the DNN, S-NSSAI, SSC mode, QoS, etc., and also the client UE 115-*k* ID. The new service request may be a new PC5-S signaling message, which may also be referred to as Relay Connection Update, Layer 2 Link Modification Request, etc.

At 625, network relay UE 115-*m* may establish a new PDU session or PDN connection with the network via base station 105-*d*, for example based on the service request at 620.

At 630, network relay UE 115-*m* may transmit, and the remote UE 115-*l* may receive, an ACK in response to the service request. In some cases, the ACK may include an update to the Layer 2 Link between the network relay UE 115-*m* and the remote UE 115-*l*. Additionally or alternatively, the ACK may result in a new Layer 2 Link to be established or a new QoS flow to be established.

At 635, remote UE 115-*l* may transmit, and network relay UE 115-*m* may receive, a report request that requests the network relay UE 115-*m* to report the one or more client UEs 115-*k* to the network via base station 105-*d*.

At 640, network relay UE 115-*m* may transmit a report of the client UE 115-*k* to the base station 105-*d* based on receiving a report request from the remote UE 115-*l* at 635 or receiving the service request at 620. In some cases, relay traffic routing at 645 may be based on this reporting.

At 645, remote UE 115-*l* may transmit relayed traffic communications from the network to the one or more client UEs 115-*h* using the IP address or prefix for the client UE 115-*k* from 615.

Figure 7:
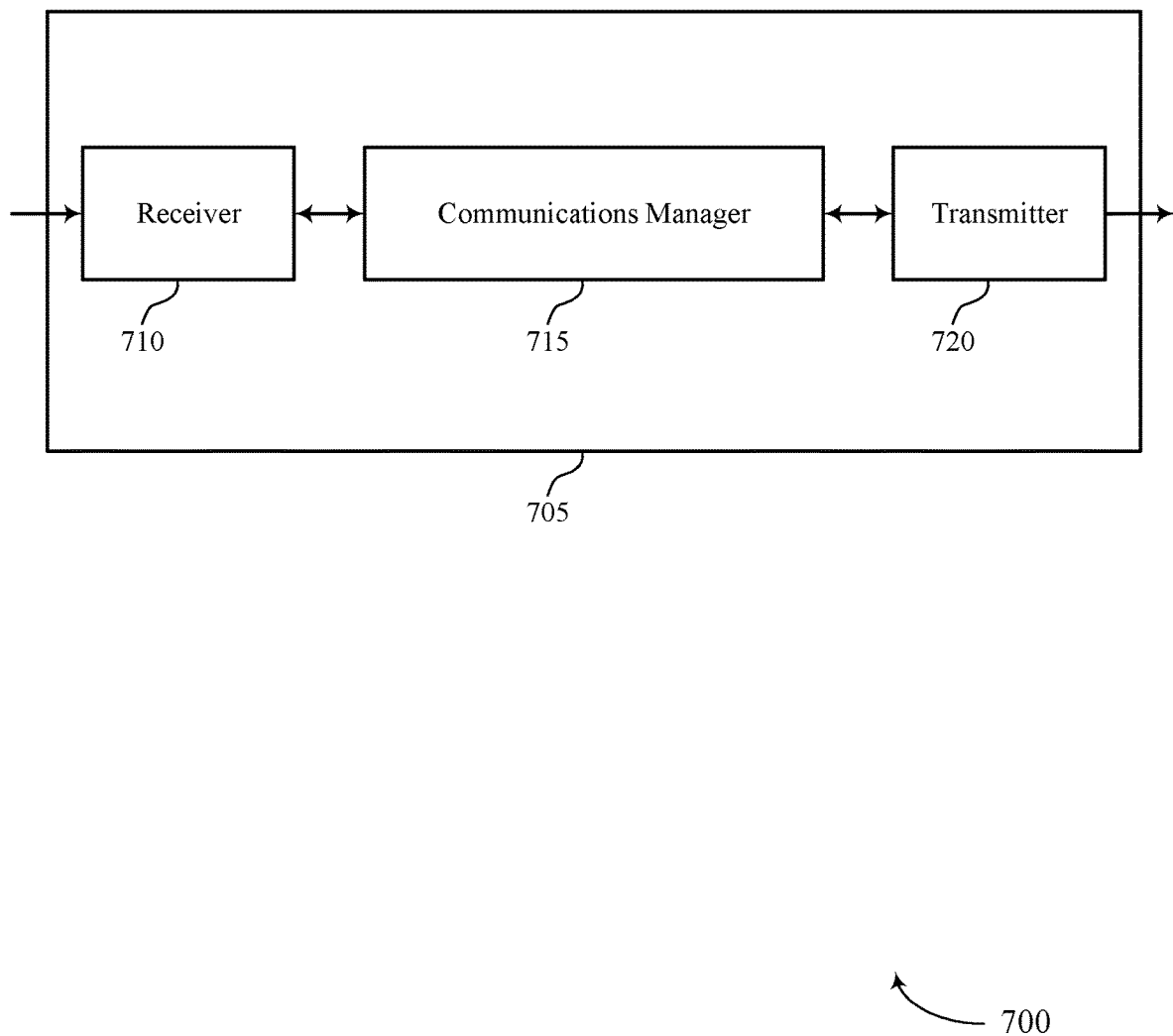
FIGS. 7 and 8 show block diagrams of devices that support proximity service multi-hop relay configuration in accordance with aspects of the present disclosure.

FIG. 7 shows a block diagram 700 of a device 705 that supports proximity service multi-hop relay configuration in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to proximity service multi-hop relay configuration, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may establish a communication link with a network, transmit, to a remote UE, a relay configuration that authorizes the remote UE as a multi-hop relay to provide a connection to the network for one or more client UEs, and provide a network connection service to the one or more client UEs through the remote UE according to the relay configuration. The communications manager 715 may also receive, from a network relay UE, a relay configuration that authorizes the remote UE as a multi-hop relay to provide a connection to a network for one or more UEs that are out of coverage of the network, transmit a relay discovery message including relay information based on receiving the relay configuration, and provide a network connection service to the one or more client UEs according to the relay configuration based on the relay discovery message. The communications manager 715 may be an example of aspects of the communications manager 1010 described herein.

The actions performed by the communications manager 715 as described herein may be implemented to realize one or more potential advantages. One implementation may allow a UE 115 to act as or connect to a network via a relay, which may allow for greater network coverage or utilization. Additionally or alternatively, a UE 115 may provide relay communications with reduced overhead signaling by communicating via unicast or groupcast transmissions. Another implementation may provide improved quality and reliability of service at the UE 115, as the link quality via the relay may be improved over other link options.

Further, a processor of a UE 115 (e.g., controlling the receiver 710, the transmitter 740, or the transceiver 1020 as described with reference to FIG. 10) may efficiently determine that the UE 115 is configured as a multi-hop UE on the PC5 link. Further, the processor of UE 115 may transmit a relay discovery message to potential client UEs 115. The processor of the UE 115 may turn on one or more processing units for receiving the relay configuration or a similar mechanism within the UE 115. As such, when the relay configuration is received, the processor may be ready to respond more efficiently to serve client UEs 115 in the ProSe system.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
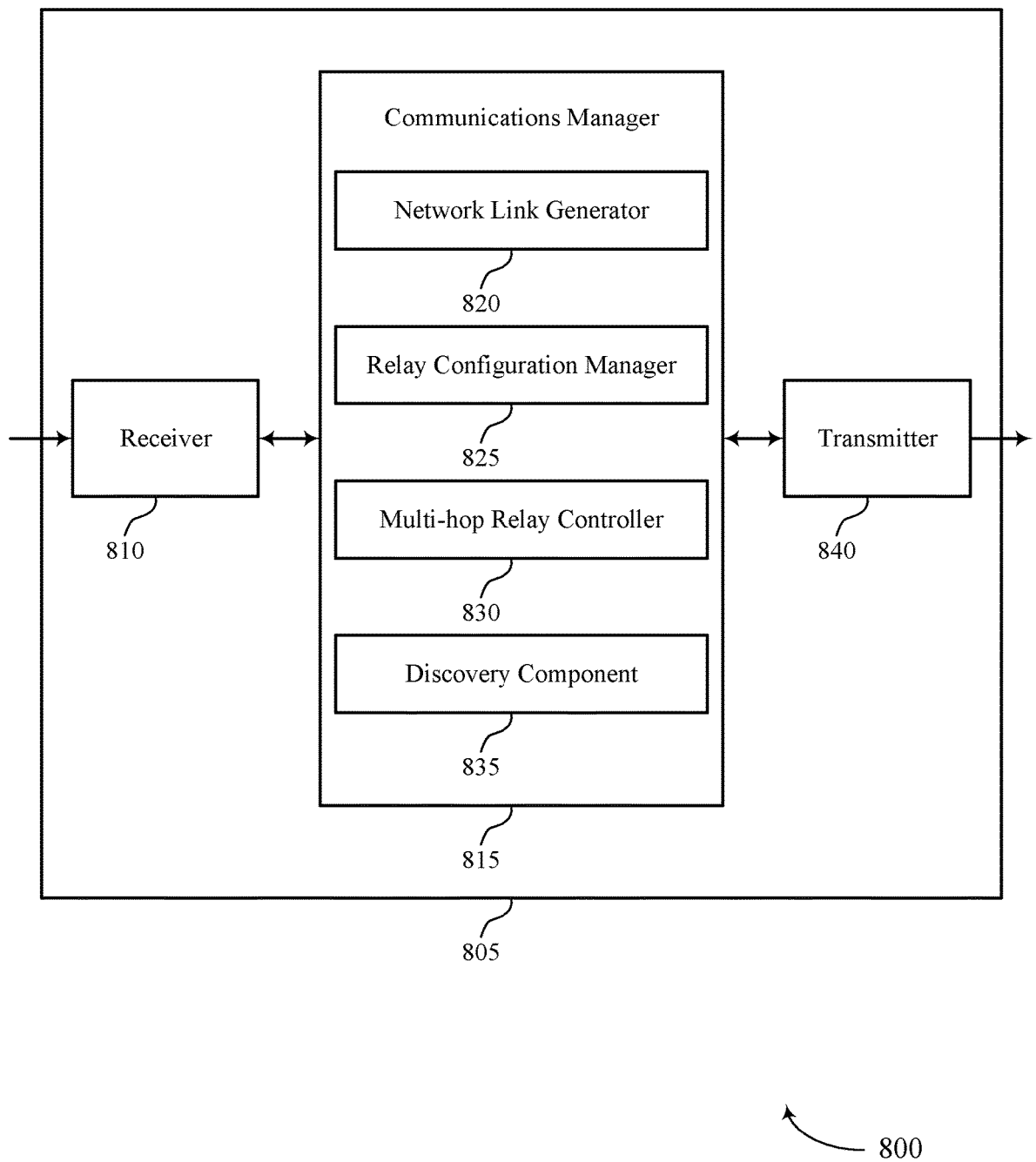

FIG. 8 shows a block diagram 800 of a device 805 that supports proximity service multi-hop relay configuration in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to proximity service multi-hop relay configuration, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a network link generator 820, a relay configuration manager 825, a multi-hop relay controller 830, and a discovery component 835. The communications manager 815 may be an example of aspects of the communications manager 1010 described herein.

The network link generator 820 may establish a communication link with a network.

The relay configuration manager 825 may transmit, to a remote UE, a relay configuration that authorizes the remote UE as a multi-hop relay to provide a connection to the network for one or more client UEs.

The multi-hop relay controller 830 may provide a network connection service to the one or more client UEs through the remote UE according to the relay configuration.

The relay configuration manager 825 may receive, from a network relay UE, a relay configuration that authorizes the remote UE as a multi-hop relay to provide a connection to a network for one or more client UEs that are out of coverage of the network.

The discovery component 835 may transmit a relay discovery message including relay information based on receiving the relay configuration.

The multi-hop relay controller 830 may provide a network connection service to the one or more client UEs according to the relay configuration based on the relay discovery message.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
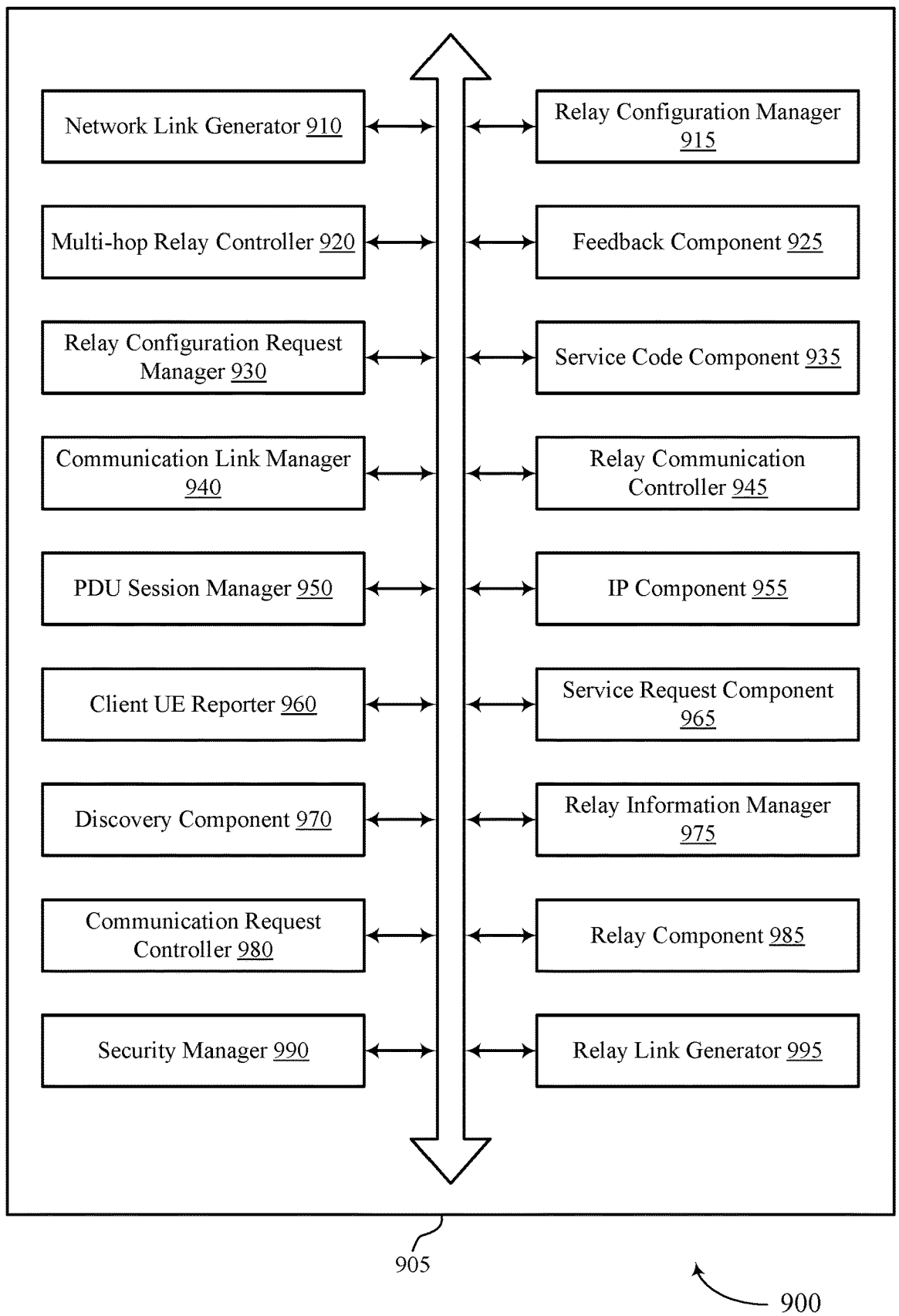
FIG. 9 shows a block diagram of a communications manager that supports proximity service multi-hop relay configuration in accordance with aspects of the present disclosure.

FIG. 9 shows a block diagram 900 of a communications manager 905 that supports proximity service multi-hop relay configuration in accordance with aspects of the present disclosure. The communications manager 905 may be an example of aspects of a communications manager 715, a communications manager 815, or a communications manager 1010 described herein. The communications manager 905 may include a network link generator 910, a relay configuration manager 915, a multi-hop relay controller 920, a feedback component 925, a relay configuration request manager 930, a service code component 935, a communication link manager 940, a relay communication controller 945, a PDU session manager 950, an IP component 955, a client UE reporter 960, a service request component 965, a discovery component 970, a relay information manager 975, a communication request controller 980, a relay component 985, a security manager 990, and a relay link generator 995. Each of these modules may communicate, directly or indirectly, with one another (e.g., via one or more buses).

The network link generator 910 may establish a communication link with a network.

The relay configuration manager 915 may transmit, to a remote UE, a relay configuration that authorizes the remote UE as a multi-hop relay to provide a connection to the network for one or more client UEs. In some examples, the relay configuration manager 915 may receive, from a network relay UE, a relay configuration that authorizes the remote UE as a multi-hop relay to provide a connection to a network for one or more client UEs that are out of coverage of the network. In some cases, the relay configuration includes one or more of a relay service code, hop information, quality of service information, and network information. In some cases, the relay service code indicates a service supported by the network.

The multi-hop relay controller 920 may provide a network connection service to the one or more client UEs through the remote UE according to the relay configuration. In some examples, the multi-hop relay controller 920 may provide a network connection service to the one or more client UEs according to the relay configuration based on the relay discovery message. In some examples, the multi-hop relay controller 920 may determine that the remote UE can serve as the multi-hop relay based on authorization information, where transmitting, to the network, the relay service code request is further based on the determining and indicates that the remote UE can serve as the multi-hop relay. In some cases, the connection to the network from the remote UE to the one or more client UEs is a sidelink connection.

The feedback component 925 may receive an acknowledgement from the remote UE based on transmitting the relay configuration. In some examples, the feedback component 925 may transmit, to the remote UE, an acknowledgement in response to the service request. In some examples, the feedback component 925 may transmit an acknowledgement to the network relay UE based on receiving the relay configuration. In some examples, the feedback component 925 may receive, from the network relay UE, an acknowledgement in response to the service request.

The relay configuration request manager 930 may receive, from the remote UE, a relay configuration request including UE capability information, where transmitting the relay configuration is based on the relay configuration request. In some examples, the relay configuration request manager 930 may transmit, to the network relay UE, a relay configuration request including UE capability information, where receiving the relay configuration is based on the relay configuration request.

The service code component 935 may transmit, to the network, a relay service code request based on receiving the relay configuration request. In some examples, the service code component 935 may receive, from the network, a code allocation for the remote UE as the multi-hop relay, where receiving the code allocation indicates that the remote UE can serve as the multi-hop relay.

The communication link manager 940 may update a communication link with the remote UE based on the relay configuration. In some examples, the communication link manager 940 may allocate an IP address or prefix to the remote UE. In some examples, the communication link manager 940 may update the communication link with the remote UE based on receiving the service request. In some examples, the communication link manager 940 may update a communication link with the network relay UE based on transmitting the acknowledgement. In some examples, the communication link manager 940 may receive an IP address or prefix from the network relay UE. In some examples, the communication link manager 940 may establish a communication link with the one or more client UEs using the internet protocol address or prefix for the one or more client UEs. In some examples, the communication link manager 940 may update the communication link with the network relay UE based on the service request.

The relay communication controller 945 may receive a communication request from the remote UE over a second communication link, where the communication request was relayed from the one or more client UEs of the remote UE. In some cases, the communication request includes a service request and an ID of the one or more client UEs.

The PDU session manager 950 may establish a PDU session or a PDN connection with the network based on receiving the communication request. In some examples, the PDU session manager 950 may establish a PDU session or a PDN connection with the network based on receiving the service request.

The IP component 955 may allocate an IP address or prefix to the client UE. In some examples, the IP component 955 may transmit, to the client UE via the remote UE, the IP address or prefix. In some examples, the IP component 955 may receive, from the network relay UE, an IP address or prefix for the one or more client UEs based on the communication request. In some examples, the IP component 955 may transmit, to the one or more client UEs, the IP address or prefix.

In some examples, the IP component 955 may allocate an IP address or prefix for the one or more client UEs from the IP address or prefix for the remote UE received from the network relay UE.

The client UE reporter 960 may report the client UE to the network based on receiving the communication request. In some examples, the client UE reporter 960 may report the client UE to the network based on receiving a report request from the remote UE or receiving the service request. In some examples, the client UE reporter 960 may transmit a report request to the network relay UE that requests the network relay UE to report the one or more client UEs to the network.

The service request component 965 may receive a service request from the remote UE over a communication link. In some examples, the service request component 965 may transmit a service request to the network relay UE over a communication link. In some cases, the service request includes an ID of a client UE. In some cases, the service request includes an ID of the one or more client UEs.

The discovery component 970 may transmit a relay discovery message including relay information based on receiving the relay configuration. In some examples, the discovery component 970 may transmit the relay discovery message according to a periodic schedule. In some examples, the discovery component 970 may receive a discovery query from the one or more client UEs. In some examples, the discovery component 970 may transmit the relay discovery message in response to the query.

The relay information manager 975 may generate relay information. In some cases, the relay information includes one or more of hop information, QoS information, and network information.

The communication request controller 980 may receive a communication request from the one or more client UEs based on transmitting the relay discovery message. In some cases, the communication request includes a service request and an ID of the one or more client UEs.

The relay component 985 may transmit the communication request from the one or more client UEs to the network relay UE. In some examples, the relay component 985 may relay communications from the network via the network relay UE to the one or more client UEs using the IP address or prefix. In some examples, the relay component 985 may relay communications from the network to the one or more client UEs using the IP address or prefix for the one or more client UEs.

The security manager 990 may receive security keys from the network relay UE.

The relay link generator 995 may establish a communication link with the one or more client UEs using the security keys.

Figure 10:
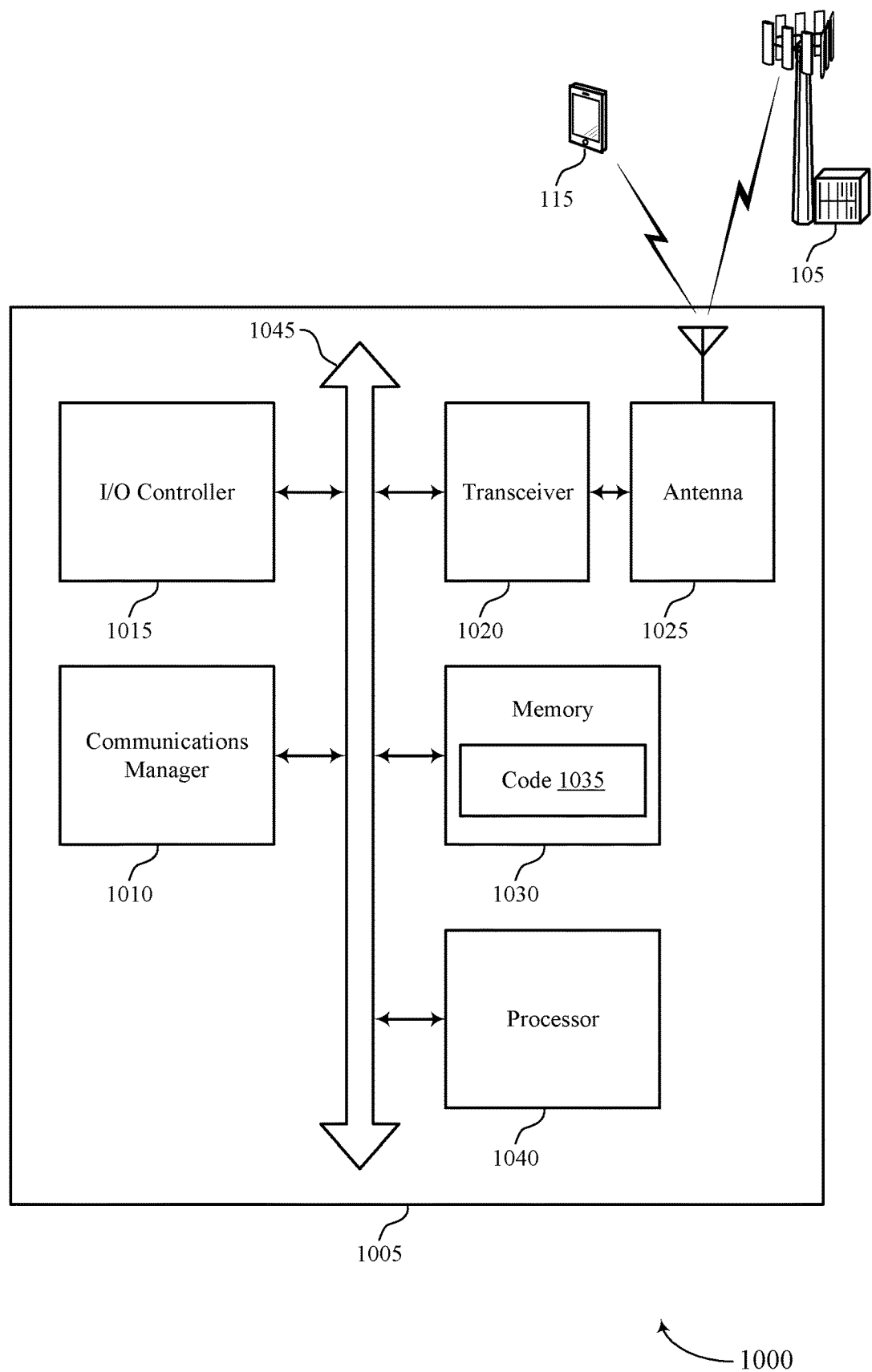
FIG. 10 shows a diagram of a system including a device that supports proximity service multi-hop relay configuration in accordance with aspects of the present disclosure.

FIG. 10 shows a diagram of a system 1000 including a device 1005 that supports proximity service multi-hop relay configuration in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may establish a communication link with a network, transmit, to a remote UE, a relay configuration that authorizes the remote UE as a multi-hop relay to provide a connection to the network for one or more client UEs, and provide a network connection service to the one or more client UEs through the remote UE according to the relay configuration. The communications manager 1010 may also receive, from a network relay UE, a relay configuration that authorizes the remote UE as a multi-hop relay to provide a connection to a network for one or more client UEs that are out of coverage of the network, transmit a relay discovery message including relay information based on receiving the relay configuration, and provide a network connection service to the one or more client UEs according to the relay configuration based on the relay discovery message.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting proximity service multi-hop relay configuration).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
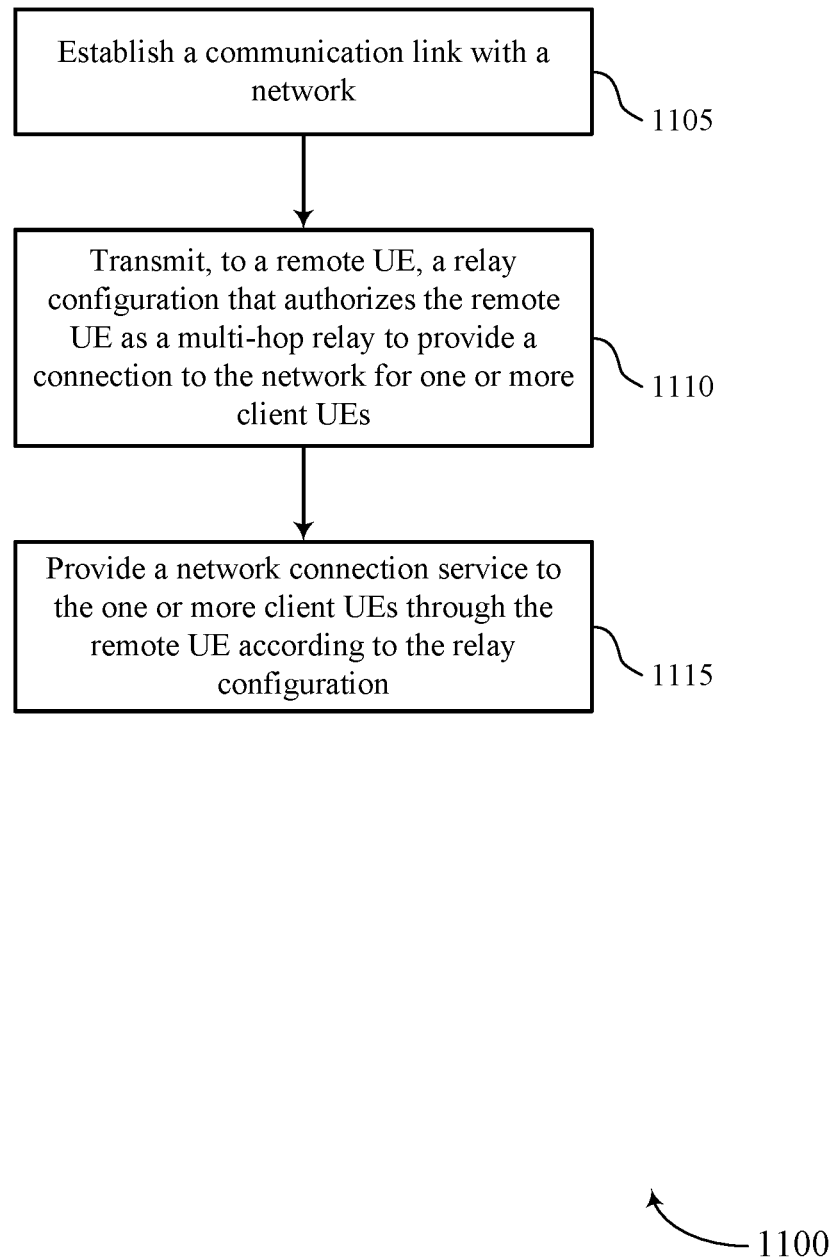
FIGS. 11 through 19 show flowcharts illustrating methods that support proximity service multi-hop relay configuration in accordance with aspects of the present disclosure.

FIG. 11 shows a flowchart illustrating a method 1100 that supports proximity service multi-hop relay configuration in accordance with aspects of the present disclosure. The operations of method 1100 may be implemented by a UE 115 or its components as described herein. For example, the operations of method 1100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1105, the UE may establish a communication link with a network. The operations of 1105 may be performed according to the methods described herein. In some examples, aspects of the operations of 1105 may be performed by a network link generator as described with reference to FIGS. 7 through 10.

At 1110, the UE may transmit, to a remote UE, a relay configuration that authorizes the remote UE as a multi-hop relay to provide a connection to the network for one or more client UEs. The operations of 1110 may be performed according to the methods described herein. In some examples, aspects of the operations of 1110 may be performed by a relay configuration manager as described with reference to FIGS. 7 through 10.

At 1115, the UE may provide a network connection service to the one or more client UEs through the remote UE according to the relay configuration. The operations of 1115 may be performed according to the methods described herein. In some examples, aspects of the operations of 1115 may be performed by a multi-hop relay controller as described with reference to FIGS. 7 through 10.

Figure 12:
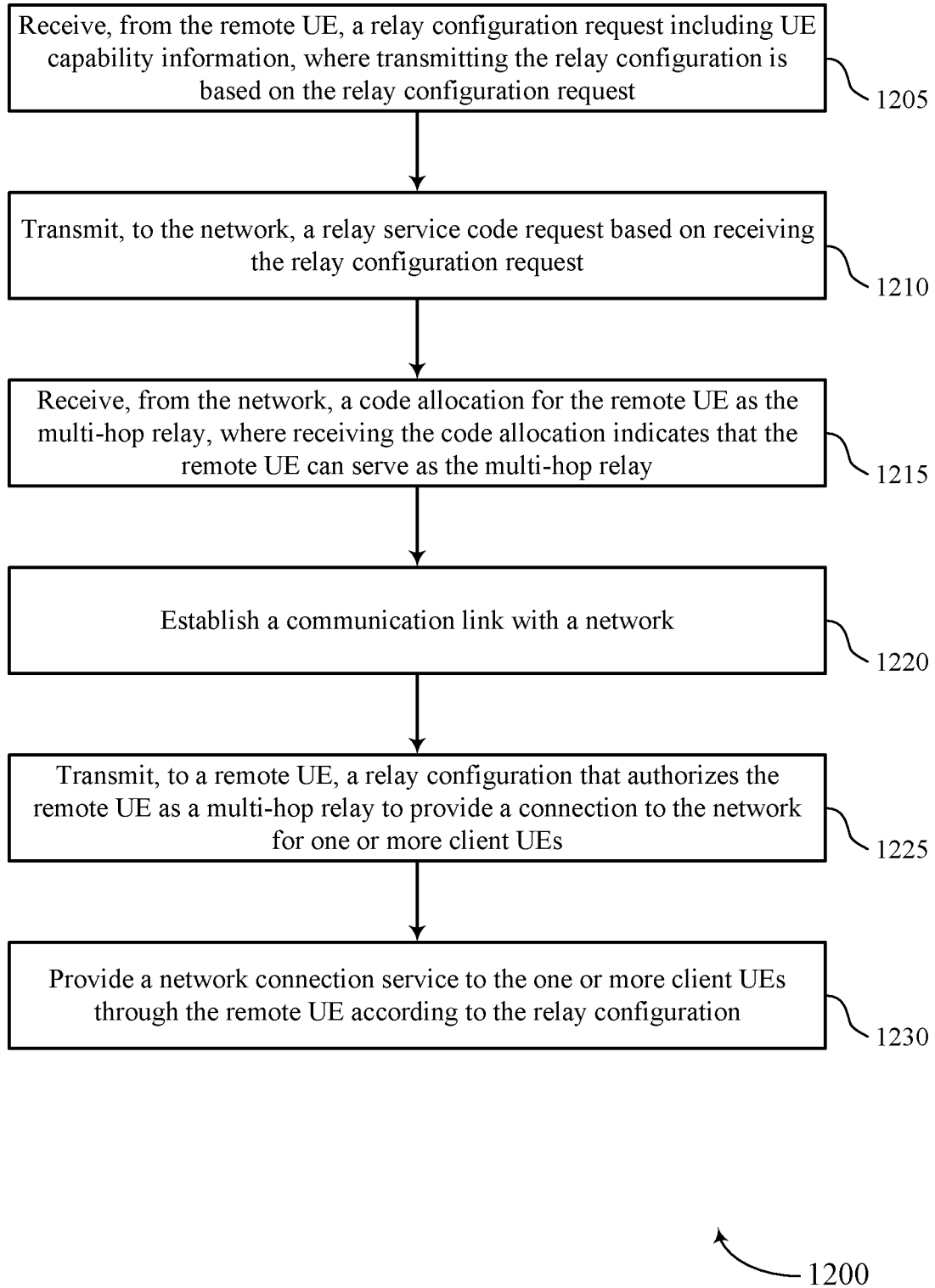

FIG. 12 shows a flowchart illustrating a method 1200 that supports proximity service multi-hop relay configuration in accordance with aspects of the present disclosure. The operations of method 1200 may be implemented by a UE 115 or its components as described herein. For example, the operations of method 1200 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1205, the UE may receive, from the remote UE, a relay configuration request including UE capability information, where transmitting the relay configuration is based on the relay configuration request. The operations of 1205 may be performed according to the methods described herein. In some examples, aspects of the operations of 1205 may be performed by a relay configuration request manager as described with reference to FIGS. 7 through 10.

At 1210, the UE may transmit, to the network, a relay service code request based on receiving the relay configuration request. The operations of 1210 may be performed according to the methods described herein. In some examples, aspects of the operations of 1210 may be performed by a service code component as described with reference to FIGS. 7 through 10.

At 1215, the UE may receive, from the network, a code allocation for the remote UE as the multi-hop relay, where receiving the code allocation indicates that the remote UE can serve as the multi-hop relay. The operations of 1215 may be performed according to the methods described herein. In some examples, aspects of the operations of 1215 may be performed by a service code component as described with reference to FIGS. 7 through 10.

At 1220, the UE may establish a communication link with a network. The operations of 1220 may be performed according to the methods described herein. In some examples, aspects of the operations of 1220 may be performed by a network link generator as described with reference to FIGS. 7 through 10.

At 1225, the UE may transmit, to a remote UE, a relay configuration that authorizes the remote UE as a multi-hop relay to provide a connection to the network for one or more client UEs. The operations of 1225 may be performed according to the methods described herein. In some examples, aspects of the operations of 1225 may be performed by a relay configuration manager as described with reference to FIGS. 7 through 10.

At 1230, the UE may provide a network connection service to the one or more client UEs through the remote UE according to the relay configuration. The operations of 1230 may be performed according to the methods described herein. In some examples, aspects of the operations of 1230 may be performed by a multi-hop relay controller as described with reference to FIGS. 7 through 10.

Figure 13:
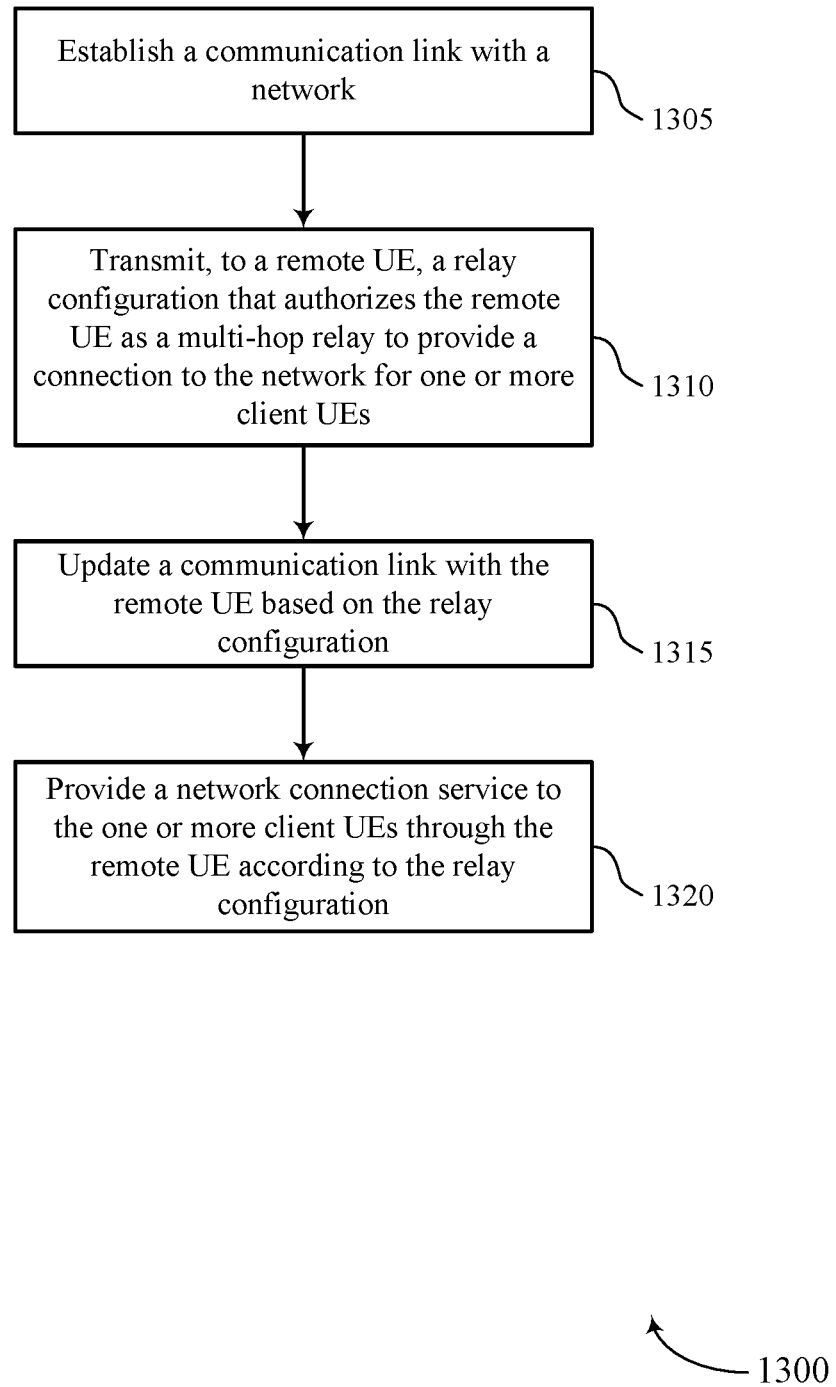

FIG. 13 shows a flowchart illustrating a method 1300 that supports proximity service multi-hop relay configuration in accordance with aspects of the present disclosure. The operations of method 1300 may be implemented by a UE 115 or its components as described herein. For example, the operations of method 1300 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1305, the UE may establish a communication link with a network. The operations of 1305 may be performed according to the methods described herein. In some examples, aspects of the operations of 1305 may be performed by a network link generator as described with reference to FIGS. 7 through 10.

At 1310, the UE may transmit, to a remote UE, a relay configuration that authorizes the remote UE as a multi-hop relay to provide a connection to the network for one or more client UEs. The operations of 1310 may be performed according to the methods described herein. In some examples, aspects of the operations of 1310 may be performed by a relay configuration manager as described with reference to FIGS. 7 through 10.

At 1315, the UE may update a communication link with the remote UE based on the relay configuration. The operations of 1315 may be performed according to the methods described herein. In some examples, aspects of the operations of 1315 may be performed by a communication link manager as described with reference to FIGS. 7 through 10.

At 1320, the UE may provide a network connection service to the one or more client UEs through the remote UE according to the relay configuration. The operations of 1320 may be performed according to the methods described herein. In some examples, aspects of the operations of 1320 may be performed by a multi-hop relay controller as described with reference to FIGS. 7 through 10.

Figure 14:
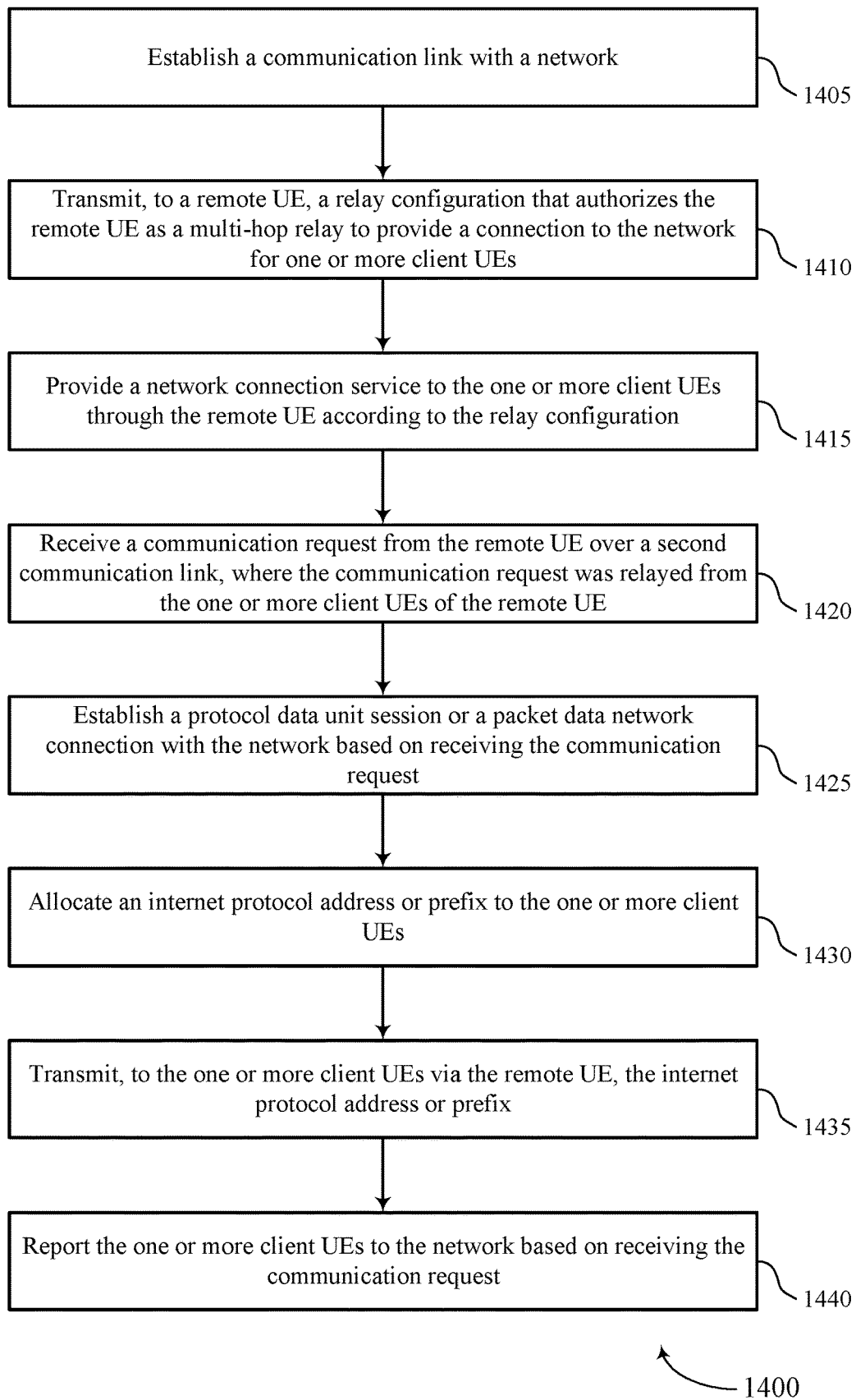

FIG. 14 shows a flowchart illustrating a method 1400 that supports proximity service multi-hop relay configuration in accordance with aspects of the present disclosure. The operations of method 1400 may be implemented by a UE 115 or its components as described herein. For example, the operations of method 1400 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1405, the UE may establish a communication link with a network. The operations of 1405 may be performed according to the methods described herein. In some examples, aspects of the operations of 1405 may be performed by a network link generator as described with reference to FIGS. 7 through 10.

At 1410, the UE may transmit, to a remote UE, a relay configuration that authorizes the remote UE as a multi-hop relay to provide a connection to the network for one or more client UEs. The operations of 1410 may be performed according to the methods described herein. In some examples, aspects of the operations of 1410 may be performed by a relay configuration manager as described with reference to FIGS. 7 through 10.

At 1415, the UE may provide a network connection service to the one or more client UEs through the remote UE according to the relay configuration. The operations of 1415 may be performed according to the methods described herein. In some examples, aspects of the operations of 1415 may be performed by a multi-hop relay controller as described with reference to FIGS. 7 through 10.

At 1420, the UE may receive a communication request from the remote UE over a second communication link, where the communication request was relayed from the one or more client UEs of the remote UE. The operations of 1420 may be performed according to the methods described herein. In some examples, aspects of the operations of 1420 may be performed by a relay communication controller as described with reference to FIGS. 7 through 10.

At 1425, the UE may establish a PDU session or a PDN connection with the network based on receiving the communication request. The operations of 1425 may be performed according to the methods described herein. In some examples, aspects of the operations of 1425 may be performed by a PDU session manager as described with reference to FIGS. 7 through 10.

At 1430, the UE may allocate an IP address or prefix to the one or more client UEs. The operations of 1430 may be performed according to the methods described herein. In some examples, aspects of the operations of 1430 may be performed by an IP component as described with reference to FIGS. 7 through 10.

At 1435, the UE may transmit, to the one or more client UEs via the remote UE, the internet protocol address or prefix. The operations of 1435 may be performed according to the methods described herein. In some examples, aspects of the operations of 1435 may be performed by an IP component as described with reference to FIGS. 7 through 10.

At 1440, the UE may report the one or more client UEs to the network based on receiving the communication request. The operations of 1440 may be performed according to the methods described herein. In some examples, aspects of the operations of 1440 may be performed by a client UE reporter as described with reference to FIGS. 7 through 10.

Figure 15:
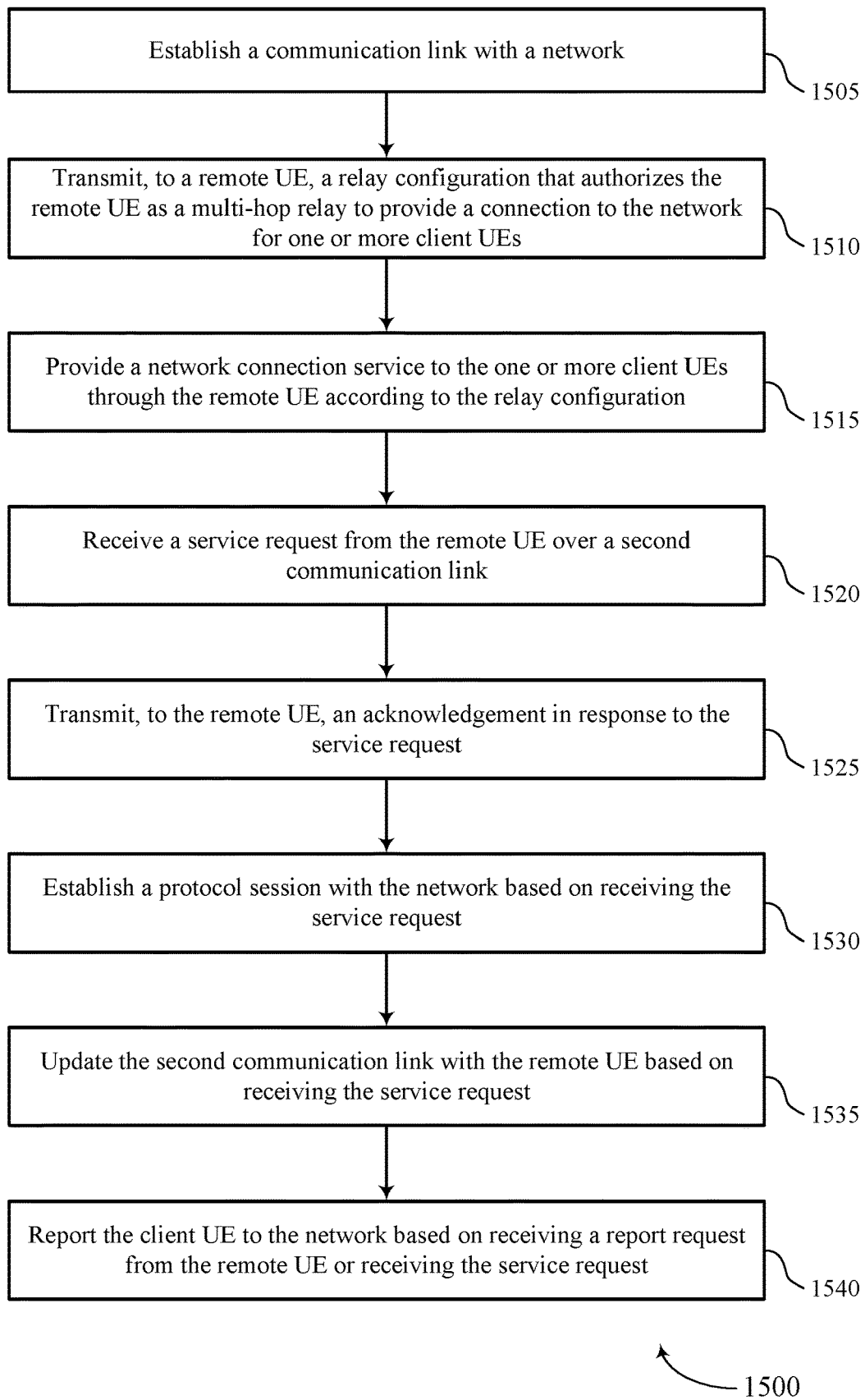

FIG. 15 shows a flowchart illustrating a method 1500 that supports proximity service multi-hop relay configuration in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may establish a communication link with a network. The operations of 1505 may be performed according to the methods described herein. In some examples, aspects of the operations of 1505 may be performed by a network link generator as described with reference to FIGS. 7 through 10.

At 1510, the UE may transmit, to a remote UE, a relay configuration that authorizes the remote UE as a multi-hop relay to provide a connection to the network for one or more client UEs. The operations of 1510 may be performed according to the methods described herein. In some examples, aspects of the operations of 1510 may be performed by a relay configuration manager as described with reference to FIGS. 7 through 10.

At 1515, the UE may provide a network connection service to the one or more client UEs through the remote UE according to the relay configuration. The operations of 1515 may be performed according to the methods described herein. In some examples, aspects of the operations of 1515 may be performed by a multi-hop relay controller as described with reference to FIGS. 7 through 10.

At 1520, the UE may receive a service request from the remote UE over a second communication link. The operations of 1520 may be performed according to the methods described herein. In some examples, aspects of the operations of 1520 may be performed by a service request component as described with reference to FIGS. 7 through 10.

At 1525, the UE may transmit, to the remote UE, an acknowledgement in response to the service request. The operations of 1525 may be performed according to the methods described herein. In some examples, aspects of the operations of 1525 may be performed by a feedback component as described with reference to FIGS. 7 through 10.

At 1530, the UE may establish a PDU session or a PDN connection with the network based on receiving the service request. The operations of 1530 may be performed according to the methods described herein. In some examples, aspects of the operations of 1530 may be performed by a PDU session manager as described with reference to FIGS. 7 through 10.

At 1535, the UE may update the second communication link with the remote UE based on receiving the service request. The operations of 1535 may be performed according to the methods described herein. In some examples, aspects of the operations of 1535 may be performed by a communication link manager as described with reference to FIGS. 7 through 10.

At 1540, the UE may report the client UE to the network based on receiving a report request from the remote UE or receiving the service request. The operations of 1540 may be performed according to the methods described herein. In some examples, aspects of the operations of 1540 may be performed by a client UE reporter as described with reference to FIGS. 7 through 10.

Figure 16:
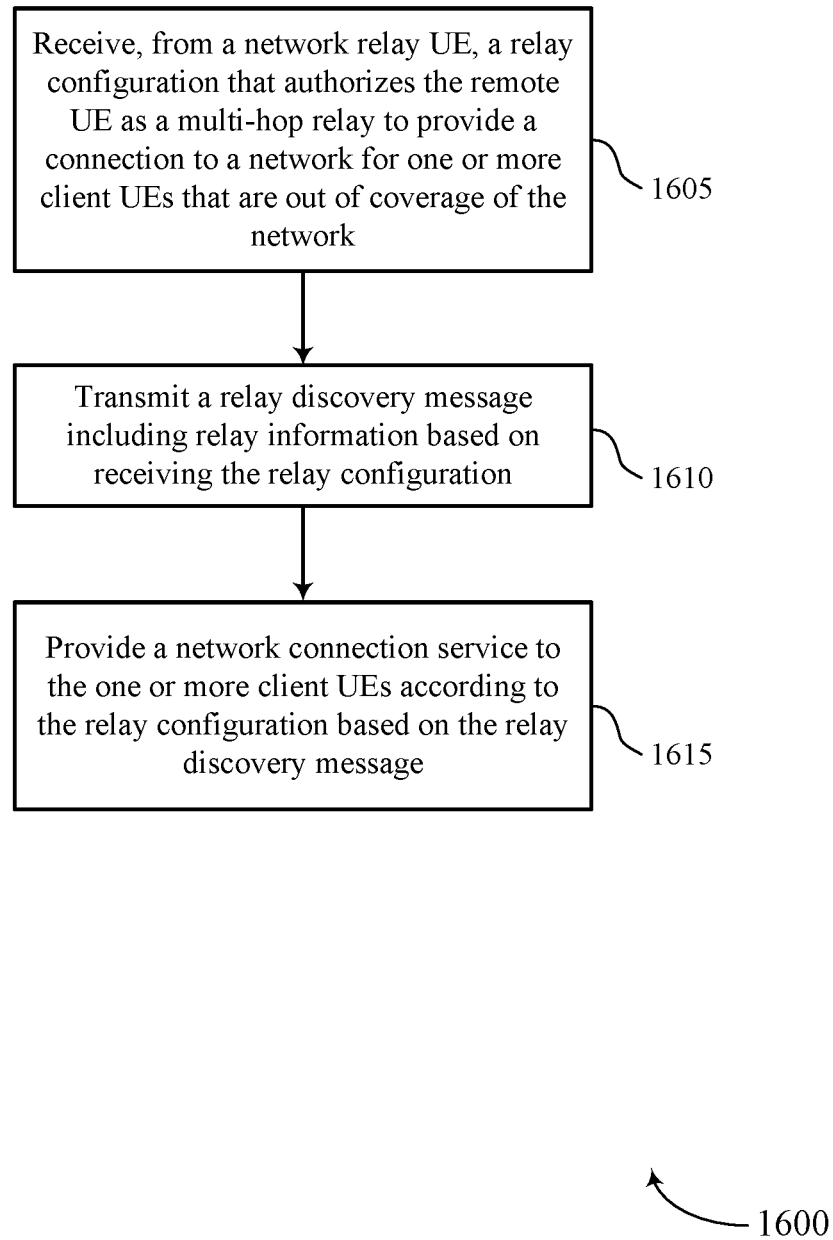

FIG. 16 shows a flowchart illustrating a method 1600 that supports proximity service multi-hop relay configuration in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a network relay UE, a relay configuration that authorizes the remote UE as a multi-hop relay to provide a connection to a network for one or more UEs that are out of coverage of the network. The operations of 1605 may be performed according to the methods described herein. In some examples, aspects of the operations of 1605 may be performed by a relay configuration manager as described with reference to FIGS. 7 through 10.

At 1610, the UE may transmit a relay discovery message including relay information based on receiving the relay configuration. The operations of 1610 may be performed according to the methods described herein. In some examples, aspects of the operations of 1610 may be performed by a discovery component as described with reference to FIGS. 7 through 10.

At 1615, the UE may provide a network connection service to the one or more client UEs according to the relay configuration based on the relay discovery message. The operations of 1615 may be performed according to the methods described herein. In some examples, aspects of the operations of 1615 may be performed by a multi-hop relay controller as described with reference to FIGS. 7 through 10.

Figure 17:
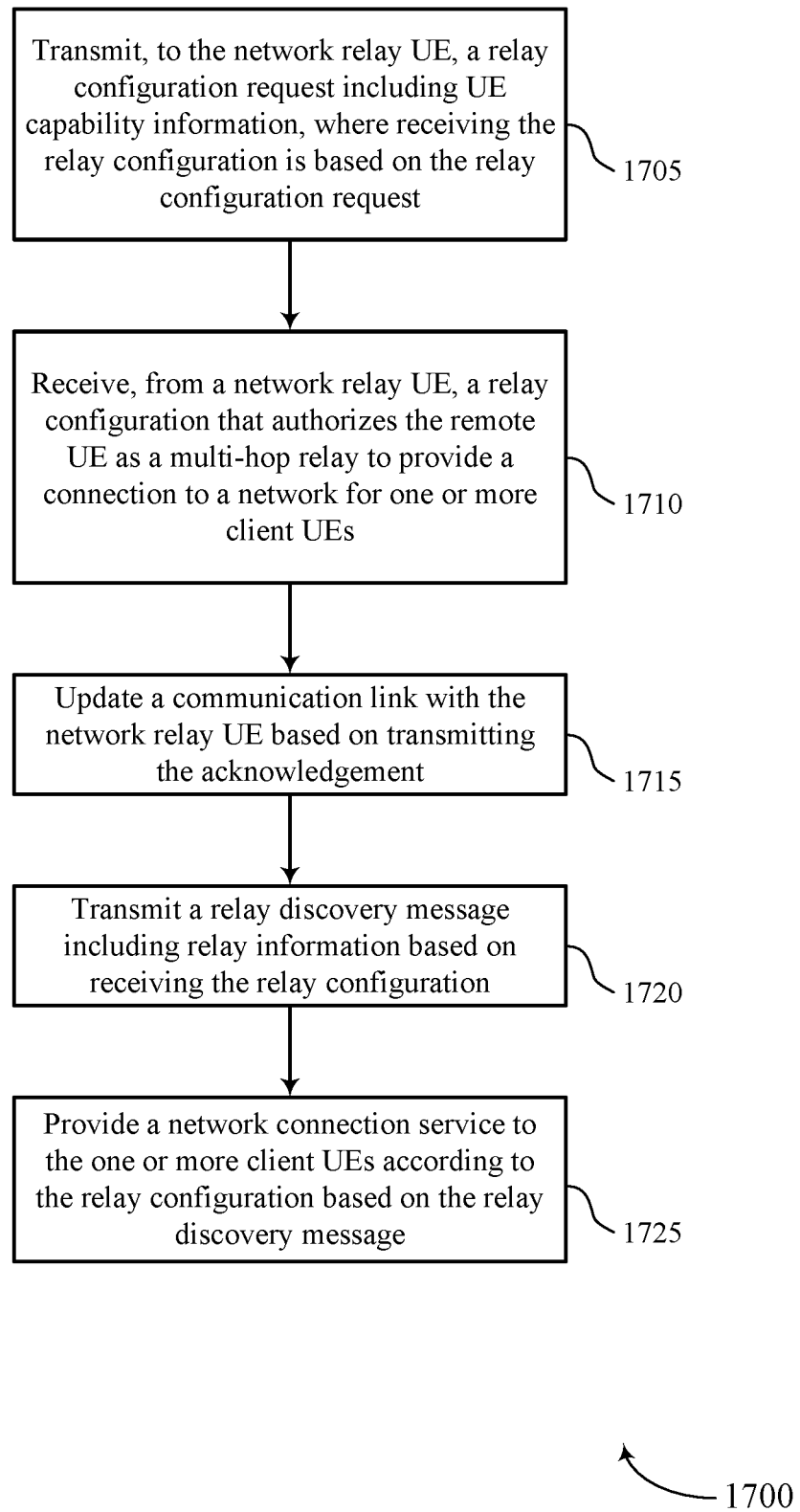

FIG. 17 shows a flowchart illustrating a method 1700 that supports proximity service multi-hop relay configuration in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may transmit, to the network relay UE, a relay configuration request including UE capability information, where receiving the relay configuration is based on the relay configuration request. The operations of 1705 may be performed according to the methods described herein. In some examples, aspects of the operations of 1705 may be performed by a relay configuration request manager as described with reference to FIGS. 7 through 10.

At 1710, the UE may receive, from a network relay UE, a relay configuration that authorizes the remote UE as a multi-hop relay to provide a connection to a network for one or more client UEs that are out of coverage of the network. The operations of 1710 may be performed according to the methods described herein. In some examples, aspects of the operations of 1710 may be performed by a relay configuration manager as described with reference to FIGS. 7 through 10.

At 1715, the UE may update a communication link with the network relay UE based on transmitting the acknowledgement. The operations of 1715 may be performed according to the methods described herein. In some examples, aspects of the operations of 1715 may be performed by a communication link manager as described with reference to FIGS. 7 through 10.

At 1720, the UE may transmit a relay discovery message including relay information based on receiving the relay configuration. The operations of 1720 may be performed according to the methods described herein. In some examples, aspects of the operations of 1720 may be performed by a discovery component as described with reference to FIGS. 7 through 10.

At 1725, the UE may provide a network connection service to the one or more client UEs according to the relay configuration based on the relay discovery message. The operations of 1725 may be performed according to the methods described herein. In some examples, aspects of the operations of 1725 may be performed by a multi-hop relay controller as described with reference to FIGS. 7 through 10.

Figure 18:
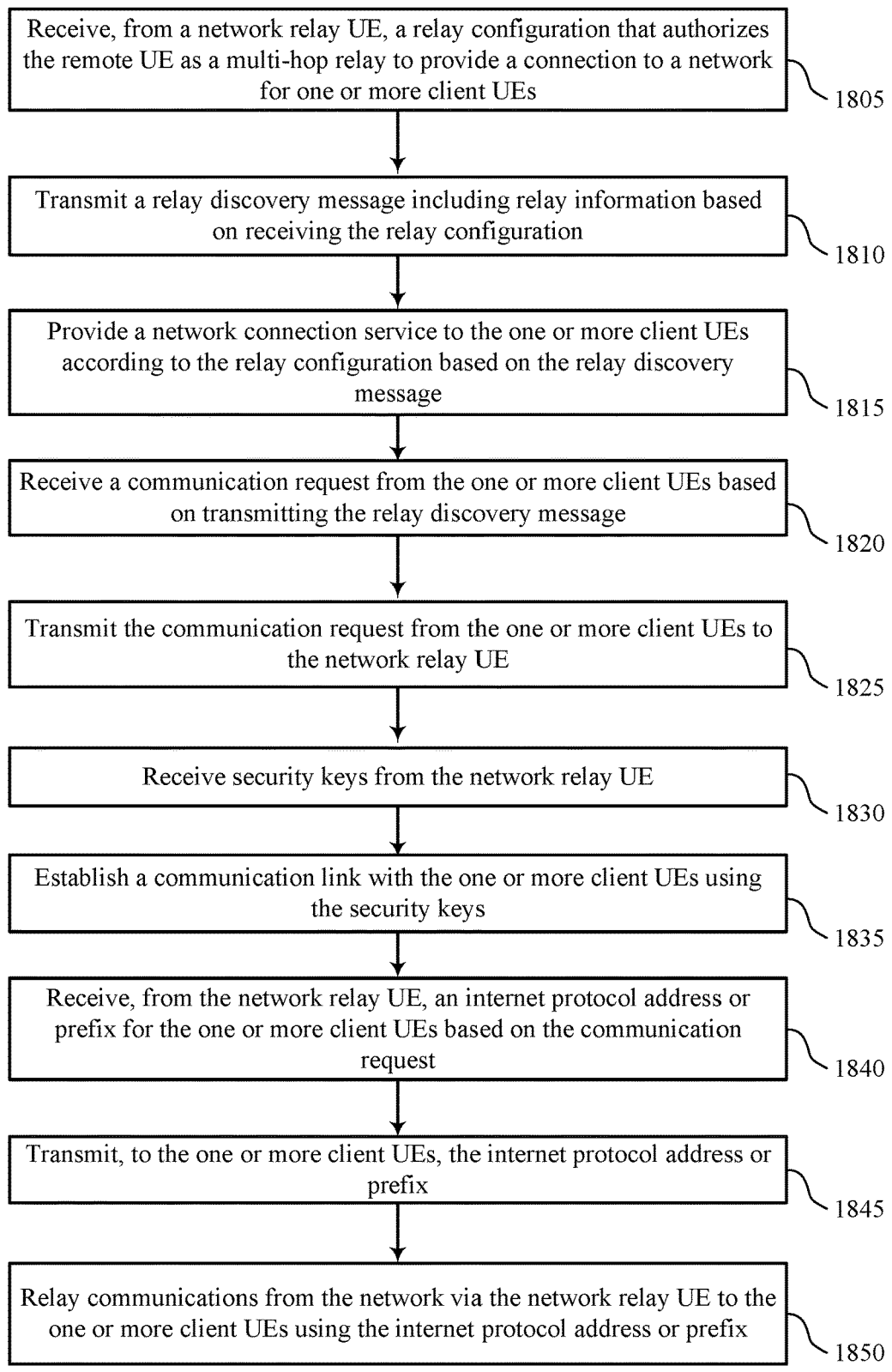

FIG. 18 shows a flowchart illustrating a method 1800 that supports proximity service multi-hop relay configuration in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may receive, from a network relay UE, a relay configuration that authorizes the remote UE as a multi-hop relay to provide a connection to a network for one or more client UEs that are out of coverage of the network. The operations of 1805 may be performed according to the methods described herein. In some examples, aspects of the operations of 1805 may be performed by a relay configuration manager as described with reference to FIGS. 7 through 10.

At 1810, the UE may transmit a relay discovery message including relay information based on receiving the relay configuration. The operations of 1810 may be performed according to the methods described herein. In some examples, aspects of the operations of 1810 may be performed by a discovery component as described with reference to FIGS. 7 through 10.

At 1815, the UE may provide a network connection service to the one or more client UEs according to the relay configuration based on the relay discovery message. The operations of 1815 may be performed according to the methods described herein. In some examples, aspects of the operations of 1815 may be performed by a multi-hop relay controller as described with reference to FIGS. 7 through 10.

At 1820, the UE may receive a communication request from the one or more client UEs based on transmitting the relay discovery message. The operations of 1820 may be performed according to the methods described herein. In some examples, aspects of the operations of 1820 may be performed by a communication request controller as described with reference to FIGS. 7 through 10.

At 1825, the UE may transmit the communication request from the one or more client UEs to the network relay UE. The operations of 1825 may be performed according to the methods described herein. In some examples, aspects of the operations of 1825 may be performed by a relay component as described with reference to FIGS. 7 through 10.

At 1830, the UE may receive security keys from the network relay UE. The operations of 1830 may be performed according to the methods described herein. In some examples, aspects of the operations of 1830 may be performed by a security manager as described with reference to FIGS. 7 through 10.

At 1835, the UE may establish a communication link with the one or more client UEs using the security keys. The operations of 1835 may be performed according to the methods described herein. In some examples, aspects of the operations of 1835 may be performed by a relay link generator as described with reference to FIGS. 7 through 10.

At 1840, the UE may receive, from the network relay UE, an IP address or prefix for the one or more client UEs based on the communication request. The operations of 1840 may be performed according to the methods described herein. In some examples, aspects of the operations of 1840 may be performed by an IP component as described with reference to FIGS. 7 through 10.

At 1845, the UE may transmit, to the one or more client UEs, the IP address or prefix. The operations of 1845 may be performed according to the methods described herein. In some examples, aspects of the operations of 1845 may be performed by an IP component as described with reference to FIGS. 7 through 10.

At 1850, the UE may relay communications from the network via the network relay UE to the one or more client UEs using the IP address or prefix. The operations of 1850 may be performed according to the methods described herein. In some examples, aspects of the operations of 1850 may be performed by a relay component as described with reference to FIGS. 7 through 10.

Figure 19:
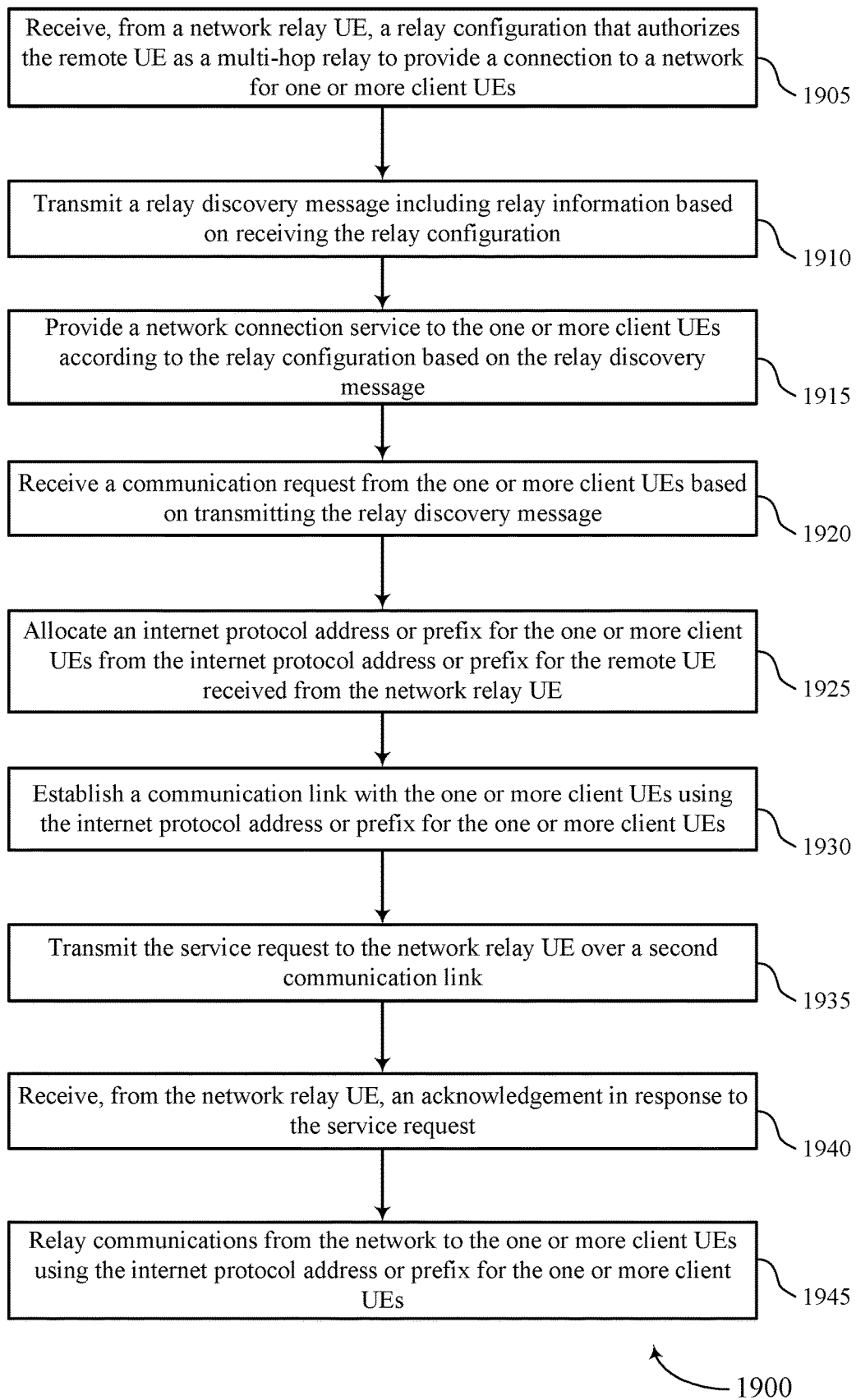

FIG. 19 shows a flowchart illustrating a method 1900 that supports proximity service multi-hop relay configuration in accordance with aspects of the present disclosure. The operations of method 1900 may be implemented by a UE 115 or its components as described herein. For example, the operations of method 1900 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1905, the UE may receive, from a network relay UE, a relay configuration that authorizes the remote UE as a multi-hop relay to provide a connection to a network for one or more client UEs that are out of coverage of the network. The operations of 1905 may be performed according to the methods described herein. In some examples, aspects of the operations of 1905 may be performed by a relay configuration manager as described with reference to FIGS. 7 through 10.

At 1910, the UE may transmit a relay discovery message including relay information based on receiving the relay configuration. The operations of 1910 may be performed according to the methods described herein. In some examples, aspects of the operations of 1910 may be performed by a discovery component as described with reference to FIGS. 7 through 10.

At 1915, the UE may provide a network connection service to the one or more client UEs according to the relay configuration based on the relay discovery message. The operations of 1915 may be performed according to the methods described herein. In some examples, aspects of the operations of 1915 may be performed by a multi-hop relay controller as described with reference to FIGS. 7 through 10.

At 1920, the UE may receive a communication request from the one or more client UEs based on transmitting the relay discovery message. The operations of 1920 may be performed according to the methods described herein. In some examples, aspects of the operations of 1920 may be performed by a communication request controller as described with reference to FIGS. 7 through 10.

At 1925, the UE may allocate an IP address or prefix for the one or more client UEs from the IP address or prefix for the remote UE received from the network relay UE. The operations of 1925 may be performed according to the methods described herein. In some examples, aspects of the operations of 1925 may be performed by an IP component as described with reference to FIGS. 7 through 10.

At 1930, the UE may establish a communication link with the one or more client UEs using the IP address or prefix for the one or more client UEs. The operations of 1930 may be performed according to the methods described herein. In some examples, aspects of the operations of 1930 may be performed by a communication link manager as described with reference to FIGS. 7 through 10.

At 1935, the UE may transmit a service request to the network relay UE over a second communication link. The operations of 1935 may be performed according to the methods described herein. In some examples, aspects of the operations of 1935 may be performed by a service request component as described with reference to FIGS. 7 through 10.

At 1940, the UE may receive, from the network relay UE, an acknowledgement in response to the service request. The operations of 1940 may be performed according to the methods described herein. In some examples, aspects of the operations of 1940 may be performed by a feedback component as described with reference to FIGS. 7 through 10.

At 1945, the UE may relay communications from the network to the one or more client UEs using the IP address or prefix for the one or more client UEs. The operations of 1945 may be performed according to the methods described herein. In some examples, aspects of the operations of 1945 may be performed by a relay component as described with reference to FIGS. 7 through 10.

The following provides an overview of aspects of the present disclosure:

Aspect 1: A method for wireless communications at a network relay UE, comprising: establishing a communication link with a network; transmitting, to a remote UE, a relay configuration that authorizes the remote UE as a multi-hop relay to provide a connection to the network for one or more client UEs; and providing a network connection service to the one or more client UEs through the remote UE according to the relay configuration.

Aspect 2: The method of aspect 1, further comprising: receiving, from the remote UE, a relay configuration request comprising UE capability information, wherein transmitting the relay configuration is based at least in part on the relay configuration request.

Aspect 3: The method of aspect 2, further comprising: transmitting, to the network, a relay service code request based at least in part on receiving the relay configuration request.

Aspect 4: The method of aspect 3, further comprising: determining that the remote UE can serve as the multi-hop relay based at least in part on authorization information, wherein transmitting, to the network, the relay service code request is further based at least in part on the determining and indicates that the remote UE can serve as the multi-hop relay.

Aspect 5: The method of any of aspects 2 through 4, further comprising: receiving, from the network, a code allocation for the remote UE as the multi-hop relay, wherein receiving the code allocation indicates that the remote UE can serve as the multi-hop relay.

Aspect 6: The method of any of aspects 1 through 5, wherein the relay configuration comprises one or more of a relay service code, hop information, quality of service information, and network information.

Aspect 7: The method of any of aspects 1 through 6, further comprising: receiving a communication request from the remote UE over a second communication link, wherein the communication request was relayed from the one or more client UEs of the remote UE.

Aspect 8: The method of aspect 7, wherein the communication request comprises a service request and an ID of the one or more client UEs.

Aspect 9: The method of any of aspects 7 through 8, further comprising: establishing a PDU session or a PDN connection with the network based at least in part on receiving the communication request.

Aspect 10: The method of any of aspects 7 through 9, further comprising: reporting the one or more client UEs to the network based at least in part on receiving the communication request.

Aspect 11: The method of any of aspects 1 through 10, further comprising: receiving a service request from the remote UE over a second communication link; and transmitting, to the remote UE, an acknowledgement in response to the service request, wherein the service request comprises an ID of a client UE.

Aspect 12: The method of aspect 11, further comprising: reporting the client UE to the network based at least in part on receiving a report request from the remote UE or receiving the service request.

Aspect 13: The method of any of aspects 1 through 12, wherein the connection to the network from the remote UE to the one or more client UEs is a sidelink connection.

Aspect 14: A method for wireless communications at a remote UE, comprising: receiving, from a network relay UE, a relay configuration that authorizes the remote UE as a multi-hop relay to provide a connection to a network for one or more client UEs that are out of coverage of the network; transmitting a relay discovery message comprising relay information based at least in part on receiving the relay configuration; and providing a network connection service to the one or more client UEs according to the relay configuration based at least in part on the relay discovery message.

Aspect 15: The method of aspect 14, further comprising: transmitting, to the network relay UE, a relay configuration request comprising UE capability information, wherein receiving the relay configuration is based at least in part on the relay configuration request.

Aspect 16: The method of any of aspects 14 through 15, wherein transmitting the relay discovery message further comprises: transmitting the relay discovery message according to a periodic schedule.

Aspect 17: The method of any of aspects 14 through 15, wherein transmitting the relay discovery message further comprises: receiving a discovery query from the one or more client UEs; and transmitting the relay discovery message in response to the discovery query.

Aspect 18: The method of any of aspects 14 through 17, wherein the relay information comprises one or more of hop information, quality of service information, and network information.

Aspect 19: The method of any of aspects 14 through 18, further comprising: receiving a communication request from the one or more client UEs based at least in part on transmitting the relay discovery message, wherein the communication request comprises a service request and an ID of the one or more client UEs.

Aspect 20: The method of aspect 19, further comprising: transmitting the communication request from the one or more client UEs to the network relay UE.

Aspect 21: The method of aspect 20, further comprising: receiving security keys from the network relay UE; and establishing a communication link with the one or more client UEs using the security keys.

Aspect 22: The method of any of aspects 19 through 21, further comprising: allocating an IP address or prefix for the one or more client UEs from the IP address or prefix for the remote UE received from the network relay UE; and establishing a communication link with the one or more client UEs using the IP address or prefix for the one or more client UEs.

Aspect 23: The method of aspect 22, further comprising: transmitting the service request to the network relay UE over a second communication link; and receiving, from the network relay UE, an acknowledgement in response to the service request, wherein the service request comprises the ID of the one or more client UEs.

Aspect 24: The method of any of aspects 22 through 23, further comprising: transmitting a report request to the network relay UE that requests the network relay UE to report the one or more client UEs to the network.

Aspect 25: The method of any of aspects 22 through 24, further comprising: relaying communications from the network to the one or more client UEs using the IP address or prefix for the one or more client UEs.

Aspect 26: The method of any of aspects 19 through 25, wherein the connection to the network from the remote UE to the one or more client UEs is a sidelink connection.

Aspect 27: An apparatus for wireless communications at a network relay UE, comprising a processor; memory coupled with the processor; and instructions stored in the memory and executable by the processor to cause the apparatus to perform a method of any of aspects 1 through 13.

Aspect 28: An apparatus for wireless communications at a network relay UE, comprising at least one means for performing a method of any of aspects 1 through 13.

Aspect 29: A non-transitory computer-readable medium storing code for wireless communications at a network relay UE, the code comprising instructions executable by a processor to perform a method of any of aspects 1 through 13.

Aspect 30: An apparatus for wireless communications at a remote UE, comprising a processor; memory coupled with the processor; and instructions stored in the memory and executable by the processor to cause the apparatus to perform a method of any of aspects 14 through 26.

Aspect 31: An apparatus for wireless communications at a remote UE, comprising at least one means for performing a method of any of aspects 14 through 26.

Aspect 32: A non-transitory computer-readable medium storing code for wireless communications at a remote UE, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a network relay user equipment (UE), comprising:
   establishing a communication link with a network;
   receiving, from a remote UE, a relay configuration request comprising UE capability information associated with the remote UE;
   receiving, from the network via the communication link, a code allocation for the remote UE as a multi-hop relay, wherein receiving the code allocation indicates that the remote UE can serve as the multi-hop relay;
   transmitting, to the remote UE in response to the relay configuration request comprising the UE capability information, a relay configuration that indicates an authorization for the remote UE to act as a multi-hop relay to provide a connection to the network for one or more client UEs, wherein the authorization is based at least in part on the code allocation; and
   providing a network connection service to the one or more client UEs through the remote UE according to the relay configuration.

2. The method of claim 1, further comprising:
   transmitting, to the network via the communication link, a relay service code request based at least in part on receiving the relay configuration request.

3. The method of claim 2, further comprising:
   determining that the remote UE can serve as the multi-hop relay based at least in part on the code allocation, wherein transmitting, to the network, the relay service code request is further based at least in part on the determining and wherein transmitting the relay service code request indicates that the remote UE can serve as the multi-hop relay.

4. The method of claim 1, wherein the relay configuration comprises one or more of a relay service code, hop information, quality of service information, and network information.

5. The method of claim 1, further comprising:
   receiving a communication request from the remote UE over a second communication link, wherein the communication request was relayed from the one or more client UEs of the remote UE.

6. The method of claim 5, wherein the communication request comprises a service request and an identifier of the one or more client UEs.

7. The method of claim 5, further comprising:
   establishing a protocol data unit session or a packet data network connection with the network based at least in part on receiving the communication request.

8. The method of claim 5, further comprising:
   reporting the one or more client UEs to the network based at least in part on receiving the communication request.

9. The method of claim 1, further comprising:
   receiving a service request from the remote UE over a second communication link; and
   transmitting, to the remote UE, an acknowledgement in response to the service request, wherein the service request comprises an identifier of a client UE.

10. The method of claim 9, further comprising:
    reporting the client UE to the network based at least in part on receiving a report request from the remote UE or receiving the service request.

11. The method of claim 1, wherein the connection to the network from the remote UE to the one or more client UEs is a sidelink connection.

12. A method for wireless communications at a remote user equipment (UE), comprising:
    receiving, from a network relay UE, a relay configuration that authorizes the remote UE as a multi-hop relay to provide a connection to a network for one or more client UEs that are out of coverage of the network;
    transmitting a relay discovery message comprising relay information based at least in part on receiving the relay configuration from the network relay UE;
    receiving a communication request from the one or more client UEs based at least in part on transmitting the relay discovery message, wherein the communication request comprises a service request and an identifier of the one or more client UEs;
    transmitting a report request to the network relay UE that requests the network relay UE to report the one or more client UEs to the network;
    and
    providing a network connection service to the one or more client UEs according to the relay configuration based at least in part on the relay discovery message and after transmitting the report request.

13. The method of claim 12, further comprising:
transmitting, to the network relay UE, a relay configuration request comprising UE capability information associated with the remote UE, wherein receiving the relay configuration is based at least in part on the relay configuration request.

14. The method of claim 12, wherein transmitting the relay discovery message further comprises:
transmitting the relay discovery message according to a periodic schedule.

15. The method of claim 12, wherein transmitting the relay discovery message further comprises:
receiving a discovery query from the one or more client UEs; and
transmitting the relay discovery message in response to the discovery query.

16. The method of claim 12, wherein the relay information comprises one or more of hop information, quality of service information, and network information.

17. The method of claim 12, further comprising:
transmitting the communication request from the one or more client UEs to the network relay UE.

18. The method of claim 17, further comprising:
receiving security keys from the network relay UE; and
establishing a communication link with the one or more client UEs using the security keys.

19. The method of claim 12, further comprising:
allocating an internet protocol address or prefix for the one or more client UEs from internet protocol address or prefix for the remote UE received from the network relay UE; and
establishing a communication link with the one or more client UEs using the internet protocol address or prefix for the one or more client UEs.

20. The method of claim 19, further comprising:
transmitting the service request to the network relay UE over a second communication link; and
receiving, from the network relay UE, an acknowledgement in response to the service request, wherein the service request comprises the identifier of the one or more client UEs.

21. The method of claim 19, further comprising:
relaying communications from the network to the one or more client UEs using the internet protocol address or prefix for the one or more client UEs.

22. The method of claim 12, wherein the connection to the network from the remote UE to the one or more client UEs is a sidelink connection.

23. An apparatus for wireless communications at a network relay user equipment (UE), comprising:
a processor,
memory coupled with the processor; and
instructions stored in the memory and executable by the processor to cause the apparatus to:
establish a communication link with a network;
receive, from a remote UE, a relay configuration request comprising UE capability information associated with the remote UE;
receive, from the network via the communication link, a code allocation for the remote UE as a multi-hop relay, wherein receiving the code allocation indicates that the remote UE can serve as the multi-hop relay;
transmit, to the remote UE in response to the relay configuration request comprising the UE capability information, a relay configuration that indicates an authorization for the remote UE to act as a multi-hop relay to provide a connection to the network for one or more client UEs, wherein the authorization is based at least in part on the code allocation; and
provide a network connection service to the one or more client UEs through the remote UE according to the relay configuration.

24. An apparatus for wireless communications at a remote user equipment (UE), comprising:
a processor,
memory coupled with the processor; and
instructions stored in the memory and executable by the processor to cause the apparatus to:
receive, from a network relay UE, a relay configuration that authorizes the remote UE as a multi-hop relay to provide a connection to a network for one or more client UEs that are out of coverage of the network;
transmit a relay discovery message comprising relay information based at least in part on receiving the relay configuration from the network relay UE;
receive a communication request from the one or more client UEs based at least in part on transmitting the relay discovery message, wherein the communication request comprises a service request and an identifier of the one or more client UEs;
transmit a report request to the network relay UE that requests the network relay UE to report the one or more client UEs to the network; and
provide a network connection service to the one or more client UEs according to the relay configuration based at least in part on the relay discovery message and after transmit the report request.

25. The apparatus of claim 24, wherein the instructions are further executable by the processor to cause the apparatus to:
transmit, to the network relay UE, a relay configuration request comprising UE capability information associated with the remote UE, wherein receiving the relay configuration is based at least in part on the relay configuration request.

* * * * *